US012698433B2

(12) United States Patent
Tria et al.

(10) Patent No.: US 12,698,433 B2
(45) Date of Patent: Aug. 4, 2026

(54) SAND CONSOLIDATION AND WATER BLOCK WITH MULTIPODAL COMPOSITIONS

(71) Applicant: ChampionX LLC, Sugar Land, TX (US)

(72) Inventors: Maria Celeste Tria, Houston, TX (US); Mario Roberto Rojas, Fulshear, TX (US); Trinh Tran, Manvel, TX (US); Mahdi Kazempour, Sugar Land, TX (US); Christopher Waller, Houston, TX (US); Vittoria Balsamo-Hernandez, Fulshear, TX (US)

( * ) Notice: Subject to any disclaimer, the term of this patent is extended or adjusted under 35 U.S.C. 154(b) by 0 days.

(21) Appl. No.: 18/505,030

(22) Filed: Nov. 8, 2023

(65) Prior Publication Data

US 2024/0174913 A1 May 30, 2024

Related U.S. Application Data

(60) Provisional application No. 63/382,757, filed on Nov. 8, 2022.

(51) Int. Cl.
*C09K 8/56* (2006.01)
*C09K 8/565* (2006.01)

(52) U.S. Cl.
CPC .................................... *C09K 8/565* (2013.01)

(58) Field of Classification Search
None
See application file for complete search history.

(56) References Cited

U.S. PATENT DOCUMENTS

| | | | | |
|---|---|---|---|---|
| 4,417,623 | A | 11/1983 | Anthony | |
| 4,498,538 | A * | 2/1985 | Watkins | C09K 8/565 166/295 |
| 5,806,593 | A | 9/1998 | Surles | |
| 8,003,580 | B2 | 8/2011 | Altherr et al. | |
| 8,163,677 | B2 | 4/2012 | Endres et al. | |
| 8,596,358 | B2 | 12/2013 | Kotlar et al. | |
| 8,708,044 | B2 | 4/2014 | Aston et al. | |
| 9,441,152 | B2 | 9/2016 | Tang et al. | |
| 9,587,164 | B2 | 3/2017 | Patil et al. | |
| 9,644,135 | B2 | 5/2017 | Sarda-Mantri et al. | |
| 9,676,992 | B2 | 6/2017 | Chittattukara et al. | |
| 10,030,193 | B2 | 7/2018 | Shroff Rama et al. | |
| 10,100,247 | B2 | 10/2018 | Monastiriotis et al. | |
| 10,155,902 | B2 | 12/2018 | Salla et al. | |
| 10,233,381 | B2 | 3/2019 | Nguyen et al. | |
| 10,316,240 | B2 | 6/2019 | Patil et al. | |
| 10,428,260 | B2 | 10/2019 | Hundt | |
| 10,550,307 | B2 | 2/2020 | Patil et al. | |
| 10,550,317 | B2 | 2/2020 | Eluru et al. | |
| 11,268,008 | B2 | 3/2022 | Hundt | |
| 2016/0272872 | A1 | 9/2016 | Vo et al. | |
| 2016/0333249 | A1 | 11/2016 | Patil et al. | |
| 2017/0218263 | A1 | 8/2017 | Salla et al. | |
| 2017/0247607 | A1 * | 8/2017 | Hundt | C04B 24/281 |
| 2018/0023067 | A1 | 1/2018 | Keller et al. | |
| 2018/0328160 | A1 | 11/2018 | Belaskie et al. | |
| 2018/0346801 | A1 * | 12/2018 | Dandawate | C09K 8/68 |

OTHER PUBLICATIONS

"Organosilane film for sand migration control based on in-situ hydrolysis and polycondensation effects"; by Xiaqing Li, et al.; Journal of Petroleum Science and Engineering; vol. 158; Sep. 18, 2017; pp. 660-671.

International Searching Authority, "International Search Report and Written Opinion," issued in connection with PCT patent application No. PCT/US2023/079165, mailed on Apr. 15, 2024, 16 pages.

* cited by examiner

*Primary Examiner* — Anuradha Ahuja

(74) *Attorney, Agent, or Firm* — Keith C. Rawlins, Esq.; Scheef & Stone, L.L.P.

(57) ABSTRACT

Silane-based and silane-free compounds can be used in a method for sand consolidation in a subterranean formation, sand consolidation compositions, a method for reducing water effective permeability in a subterranean formation, and water block compositions.

6 Claims, No Drawings

SAND CONSOLIDATION AND WATER BLOCK WITH MULTIPODAL COMPOSITIONS

CROSS-REFERENCE TO RELATED APPLICATIONS

This application claims the benefit of and priority to U.S. Provisional Patent Application No. 63/382,757, filed on Nov. 8, 2022, and entitled "Sand Consolidation with Multipodal Compositions," which is incorporated by reference in its entirety.

FIELD OF THE DISCLOSURE

The present disclosure generally relates to sand consolidation with high retained permeability to oil and to blocking a permeation of water in subterranean formations.

BACKGROUND

Sand particles can be present in a subterranean formation due to naturally-occurring deposits in the subterranean formation, due to introduction of sand particles during well operations (e.g., when sand particles are used as proppant during hydraulic fracturing operations), due to formation of sand particles during subterranean formation operations, or any combination of these factors. Some of these sand particles can be referred to as unconsolidated particulates, in that, the particles can be transported with production fluid from the subterranean formation and/or the fractures in the subterranean formation, into a wellbore, where the particulates can flow to the surface of the well-site with the production fluid (e.g., hydrocarbons, brine, etc.).

The presence of unconsolidated particulates in a production fluid during hydrocarbon production is undesirable, at least because the particulates can damage or abrade producing equipment, can reduce hydrocarbon production rate, and creates need for separated sand particulates from the production fluid. For example, unconsolidated particulates may migrate toward perforations and into wellbore production casings and tubing causing in-situ plugging which can significantly hinder hydrocarbon production.

Treatment techniques have been proposed, in which compositions are injected into a subterranean formation to bond with unconsolidated particulates, such as by contacting unconsolidated sand and curing into a permeable hardened mass that is not transportable by production fluid.

Excessive water production in hydrocarbon production is also a problem that affects the life span, scaling, corrosion, and degradation of equipment associated with a production well.

There is an ongoing desire to find sand consolidation compositions and water block compositions that are options to, and improve performance over, currently available technologies.

SUMMARY

Disclosed is a method for sand consolidation in a subterranean formation, the method including: combining 1) a) an aminosilane component and an epoxysilane component, b) an aminosilane component and a silane-free cross linking component having two or more linking groups, c) an epoxysilane component and a silane-free cross linking component, or d) an aminosilane component, an epoxysilane component, and a silane-free cross linking component, and 2) a hydrocarbon carrier, to form a composition including a multipodal product and the hydrocarbon carrier; and introducing the composition into a subterranean formation via a wellbore that is formed in the subterranean formation such that the composition bonds to a sand surface of sand in the subterranean formation.

Disclosed is a sand consolidation composition including: a multipodal product including a) an aminosilane component and an epoxysilane component, b) an aminosilane component and a silane-free cross linking component having two or more linking groups, c) an epoxysilane component and a silane-free cross linking component, or d) an aminosilane component, an epoxysilane component, and a silane-free cross linking component; and a hydrocarbon carrier.

Disclosed is a method for reducing water effective permeability in a subterranean formation, the method including: combining 1) a) an aminosilane component and an epoxysilane component, b) an aminosilane component including an aminosilane and an organosilane component including an organosilane having one or more head groups configured to crosslink with an amine group of the aminosilane, c) an epoxysilane component including an epoxysilane and an organosilane component including an organosilane having one or more head groups configured to crosslink with an epoxy group of the epoxysilane, d) an isocyanosilane component and an organosilane component having one or more head groups of a primary amine group, a secondary amine group, a primary alcohol group, a secondary alcohol group, a mercapto group, or a carboxylic acid group, or e) a mercaptosilane component and an organosilane component having one or more head groups of an isocyanate group or a vinyl group, and 2) a hydrocarbon carrier, to form a composition including a multipodal product and the hydrocarbon carrier; and introducing the composition into a subterranean formation via a wellbore that is formed in the subterranean formation such that the composition bonds to a pore surface in a pore of the subterranean formation.

Disclosed is a water block composition including: a multipodal product including a) an aminosilane component and an epoxysilane component, b) an aminosilane component including an aminosilane and an organosilane component including an organosilane having one or more head groups configured to crosslink with an amine group of the aminosilane, c) an epoxysilane component including an epoxysilane and an organosilane component including an organosilane having one or more head groups configured to crosslink with an epoxy group of the epoxysilane, d) an isocyanosilane component and an organosilane component having one or more head groups of a primary amine group, a secondary amine group, a primary alcohol group, a secondary alcohol group, a mercapto group, or a carboxylic acid group, or e) a mercaptosilane component and an organosilane component having one or more head groups of an isocyanate group or a vinyl group; and a hydrocarbon carrier.

In aspects of the methods and compositions, the components and the hydrocarbon carrier can be combined in a single step to form the composition. In alternative aspects, the components can be combined to form the multipodal product, and the multipodal product can then be combined with the hydrocarbon carrier to form the composition.

Other technical features may be readily apparent to one skilled in the art from the following figures, descriptions, and claims.

DETAILED DESCRIPTION

"Unconsolidated particulates" as used herein refers to any particulates that may move from a subterranean formation and/or the fractures in the subterranean formation, into a wellbore, where the particulates can flow with production fluids (e.g., hydrocarbons) to the surface of the well-site. Unconsolidated particulates may include, for example, sand, gravel, proppant particulates, and/or formation fines.

"Sand particles" as used herein can include any siliceous material that can be found in a subterranean formation, that can be formed during a subterranean formation operation, or that can be introduced to the subterranean formation (e.g., proppant to hold open fractures)).

"Subterranean formation" refers to an underground or subsea geological formation.

"Subterranean formation operation" includes, but is not limited to, a drilling operation, a stimulation operation, an acidizing operation, an acid-fracturing operation, a sand control operation, a completion operation, a scale inhibiting operation, a water-blocking operation, a clay stabilizer operation, a fracturing operation, a frac-packing operation, a gravel packing operation, a wellbore strengthening operation, a sag control operation, a remedial operation, a near-wellbore consolidation operation, a plug and abandonment operation, or any combination thereof.

"Wellbore" refers to a hole formed in a subterranean formation, including any cased portion(s), uncased portion(s), or any other tubulars in the hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

"Organosilane" as used herein includes the disclosed aminosilanes and epoxysilanes. Each organosilane molecule has all hydrolysable bonds on a silicon-containing terminal group of the compound.

"Hydrolysable bond" refers to a bond that can be cleaved on reaction with water.

"Terminal group" as used herein refers to a group of one or more atoms located at one end of a molecule. This is in contrast to a side group or pendant group which is attached to another part of the molecule. For example, in the compound aminotriethoxysilane, the amino group and the —$Si(OEt)_3$ groups are terminal groups. In contrast in the compound bis-(triethoxysilylpropyl) amine the —$Si(OEt)_3$ groups are terminal groups, whereas the amine group is not.

"Multipodal product" as used herein refers to a reaction product containing multipodal molecules that result from combining the components disclosed herein. The multipodal product has multipodal molecules. Each multipodal molecule has two or more silicon-containing terminal groups that have hydrolysable bonds that can react with water, allowing the silicon-containing terminal groups to bind to a surface of sand particles. Multipodal molecules include dipodal molecules, tripodal molecules, quadrapodal molecules, and so on. In aspects, the scope of multipodal molecules includes mixtures of molecules having different podalities. In alternative aspects, a multipodal product may comprise, consist of, or consist essentially of molecules having a single degree of podality (e.g., dipodal or tripodal), with marginal amounts of other molecules having other degrees of podality (e.g., less than 5, 4, 3, 2, or 1 wt % of molecules having other degrees of podality that may be formed, for example, as reaction byproduct).

"Dipodal product" as used herein refers to a reaction product containing dipodal molecules having two silicon-containing terminal groups.

"Tripodal product" as used herein refers to a reaction product containing tripodal molecules having three silicon-containing terminal groups.

"Quadrapodal product" as used herein refers to a reaction product containing quadrapodal molecules having four silicon-containing terminal groups.

As used herein, any recited ranges of values contemplate all values within the range including the end points of the range, and are to be construed as support for claims reciting any sub-ranges having endpoints which are real number values within the recited range. By way of example, a disclosure in this specification of a range of from 10 to 15 shall be considered to support claims to values of 10, 11, 12, 13, 14, and 15, and to any of the following ranges: 10-11, 10-12, 10-13, 10-14, 10-15, 11-12, 11-13, 11-14, 11-15, 12-13; 12-14, 12-15, 13-14, 13-15, and 14-15.

Disclosed herein are methods and compositions for sand consolidation or for blocking a permeation of water in a subterranean formation. The methods and compositions disclosed herein may be used in any subterranean formation operation. Alternatively, the methods and compositions described herein may be used in any non-subterranean operation, including but not limited to, oil and gas, mining, chemical, pulp and paper, aerospace, medical, or automotive operations. The methods involve forming the compositions by combining a) an aminosilane component and an epoxysilane component; b) an aminosilane component and a silane-free cross linking component; c) an epoxysilane component and a silane-free cross linking component; d) an aminosilane component, an epoxysilane component, and a silane-free cross linking component; e) an aminosilane component comprising an aminosilane and an organosilane component comprising an organosilane having one or more head groups configured to crosslink with an amine group of the aminosilane, f) an epoxysilane component comprising an epoxysilane and an organosilane component comprising an organosilane having one or more head groups configured to crosslink with an epoxy group of the epoxysilane, g) an isocyanosilane component and an organosilane component having one or more head groups of a primary amine group, a secondary amine group, a primary alcohol group, a secondary alcohol group, a mercapto group, or a carboxylic acid group, or h) a mercaptosilane component and an organosilane component having one or more head groups of an isocyanate group or a vinyl group, with a hydrocarbon carrier to form a composition used for sand consolidation or blocking flow water in a subterranean formation. The compositions are the multipodal product that results from the combining steps, in the hydrocarbon carrier.

The components of the disclosed compositions are dispersible or soluble in the hydrocarbon carrier (e.g. crude oil, a base oil, an aliphatic hydrocarbon having 6 or more carbon atoms, an aromatic hydrocarbon having 6 or more carbon atoms, kerosene, naphtha, diesel fuel, or combinations thereof).

In aspects of a method, the components of the disclosed compositions can be introduced to a subterranean formation in the hydrocarbon carrier substantially without hydrolyzation, can then react with connate or residual water in the subterranean formation, and can then subsequently react with active sites on a sand surface in the subterranean formation to consolidate the sand particles or in pores of the subterranean formation to block a permeation of water through the pores.

At least one of the components in the disclosed compositions is an organosilane having at least one hydrolysable bond. In the organosilane component(s) of the disclosed compositions, the hydrolysable bond is between a silicon atom and a second atom/group in the molecule (e.g., a halide group containing Cl, F, Br, or I; or an alkoxy group). In aspects, the hydrolysable bond between a silicon atom and the second atom/group hydrolyses with connate or residual water in the subterranean formation to produce a silanol group (i.e., —Si—OH). The silanol group, which is a terminal group, can then react with active sites (e.g., Si—OH bonds) on the surface of the sand particles, forming a covalent bond.

In compositions where only one organosilane is used to form the composition (e.g., in combination with a silane-free crosslinking component described herein), the organosilane can be characterized by the formula $X_3$—Si—R, where each X can be i) a halide group containing Cl, F, Br, or I, or ii) an alkoxy group, and R can be an organo group with a primary or secondary amine functional group.

In other aspects where only one organosilane is used to form the composition (e.g., in combination with a silane-free crosslinking component described herein), the organosilane can be characterized by the formula $X_3$—Si—R', where each X can be i) a halide group containing Cl, F, Br, or I, or ii) an alkoxy group, and R can be an organo group with an epoxide group or glycidyl group.

In aspects where two organosilanes are used to form the composition, the first organosilane can be characterized by the formula $X_3$—Si—R, where each X can be i) a halide group containing Cl, F, Br, or I, or ii) an alkoxy group, and R can be an organo group with a primary or secondary amine functional group; and the second organosilane can be characterized by the formula $X_3$—Si—R', where each X can be i) a halide group containing Cl, F, Br, or I, or ii) an alkoxy group, and R' can be an organo group with an epoxide group or glycidyl group.

In aspects where two organosilanes are used to form the composition, the first organosilane can be characterized by the formula $X_3$—Si—R, where each X can be i) a halide group containing Cl, F, Br, or I, or ii) an alkoxy group, and R can be an organo group with a primary or secondary amine functional group; and the second organosilane can be another aminosilane having one or more functional headgroups that are crosslinkable to the primary or secondary amine functional group, such as an acyl chloride group, an aldehyde group, an isocyanate group, or combinations thereof.

In aspects where two organosilanes are used to form the composition, the first organosilane can be characterized by the formula $X_3$—Si—R', where each X can be i) a halide group containing Cl, F, Br, or I, or ii) an alkoxy group, and R' can be an organo group with an epoxide group or a glycidyl group; and the second organosilane can be another organosilane that has one or more functional head groups that are crosslinkable to the alkoxy group, such as an alcohol group, an isocyanate group, a carboxylic acid group, or combinations thereof.

In aspects where two organosilanes are used to form the composition, the first organosilane can be an isocyanosilane and the second organosilane can contain one or more headgroups having a primary amine, a secondary amine, a primary alcohol, a secondary alcohol, a mercapto group, a carboxylic acid group, or combinations thereof.

In aspects where two organosilanes are used to form the composition, the first organosilane can be a mercaptosilane and the second organosilane can contain one or more headgroups having an isocyanate group, a vinyl group, or a combination thereof.

In aspects, combining the components of the disclosed compositions forms a multipodal product. A multipodal product contains at least two silicon-containing terminal groups. For example, a dipodal product contains two silicon-containing terminal groups, a tripodal product contains three silicon-containing terminal groups, and so on. In the multipodal product, each of the silicon-containing groups can contain one, two, or three hydrolysable bonds from one, two, or three —Si—X groups on each silicon atom, where X is a halide group (e.g., containing Cl, F, Br, or I) or an alkoxy group. Each of the one, two, or three —Si—X groups can react with water to form —Si—OH groups that may then react with the Si—OH groups present on the surface of sand particles in a subterranean formation, and bond the silicon-containing terminal groups of the multipodal product to the sand particles. Thus, a dipodal product that has molecules with two silicon-containing terminal groups can have from 2 to 6 hydrolysable bonds (e.g., 1 to 3 hydrolysable bonds available from each silicon-containing terminal group), forming from 2 to 6 bonds with the Si—OH groups present on the surface of sand particles in a subterranean formation. Similarly, a tripodal product that has molecules with three silicon-containing terminal groups can have from 3 to 9 hydrolysable bonds (e.g., 1 to 3 hydrolysable bonds available from each silicon-containing terminal group), forming from 3 to 9 bonds with the Si—OH groups present on the surface of sand particles in a subterranean formation. Similarly still, a quadrapodal product that has molecules with three silicon-containing terminal groups can have from 4 to 12 hydrolysable bonds (e.g., 1 to 3 hydrolysable bonds available from each silicon-containing terminal group), forming from 4 to 12 bonds with the Si—OH groups present on the surface of sand particles in a subterranean formation.

First Composition

Disclosed herein is a first composition comprising, consisting of, or consisting essentially of 1) a multipodal molecule comprising an aminosilane component and an epoxysilane component; and 2) a hydrocarbon carrier. In aspects, the composition has less than 0.5 wt % water based on a total weight of the composition. In aspects, the multipodal molecule is present in a range of from about 1 wt % to about 20 wt % based on a total weight of the composition. The first composition can be embodied as a sand consolidation composition, and in such embodiments, the multipodal molecule is present in a range of from about 1 wt % to about 3 wt % based on a total weight of the sand consolidation composition. Alternatively, the first composition can be embodied as a water block composition, and in such embodiments, the multipodal molecule is present in a range of from about 4 wt % to about 20 wt %, 4 wt % to about 10 wt %, alternatively 4, 5, 6, 7, 8, 9, or 10 wt % based on a total weight of the water block composition. The first composition can be used in the method.

In aspects, a first composition can be formed by combining an aminosilane component, an epoxysilane component, and a hydrocarbon carrier, to form a multipodal product in the hydrocarbon carrier. In aspects, the aminosilane component, the epoxysilane component, and the hydrocarbon carrier can be combined in a single step to form the composition. In alternative aspects, the aminosilane component and the epoxysilane component can be combined to form the multipodal product, and the multipodal product can then be combined with the hydrocarbon carrier to form the composition.

The first composition can be formed prior to introducing the first composition into the subterranean formation (e.g., formed in a manufacturing facility remote from the well-site, or formed at the well-site prior to introduction via the wellbore).

Combining the aminosilane component and the epoxysilane component (before combining with the hydrocarbon carrier or during combining with the hydrocarbon carrier) forms the multipodal product.

The mole ratio of the aminosilane component to the epoxysilane component can range from excess moles of aminosilane component to excess moles epoxysilane component. That is, even small amounts of one of the components can cause reaction to form the multipodal products disclosed herein.

Below illustrates the combination of the aminosilane component and the epoxysilane component to form a dipodal product having dipodal molecules.

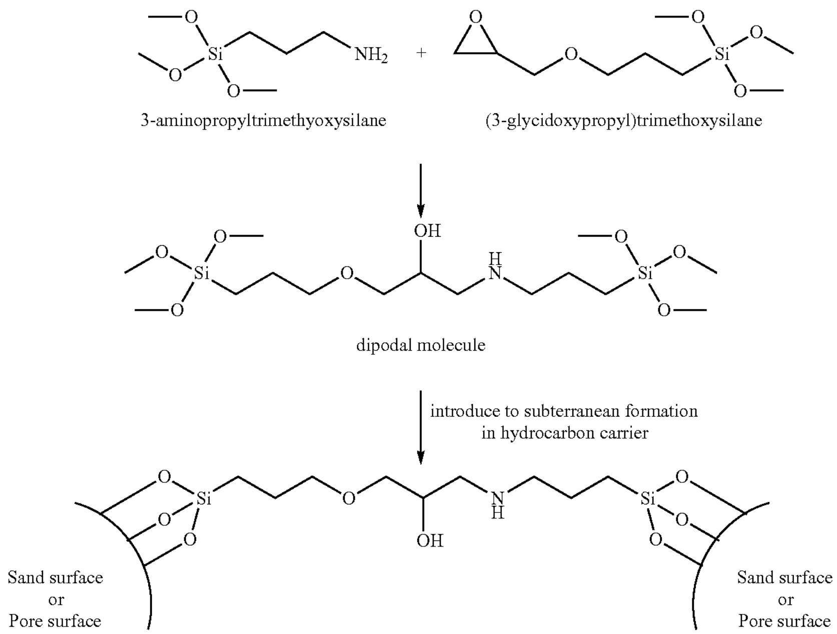

3-aminopropyltrimethyoxysilane (3-glycidoxypropyl)trimethoxysilane dipodal molecule The above shows every silanol group of the dipodal molecule has reacted with active sites (e.g., Si—OH bonds) on the surface of the sand particles, forming a covalent bond. However, it should be understood that any number of the silanol groups (1, 2, or 3) on each silicon-containing terminal group may react with the surface of sand particles while others of the silanol groups on each silicon-containing terminal group may react with other di- or multipodal molecules or other particulates or compounds in the downhole environment.

Below illustrates the combination of the aminosilane component and the epoxysilane component to form a tripodal product having tripodal molecules.

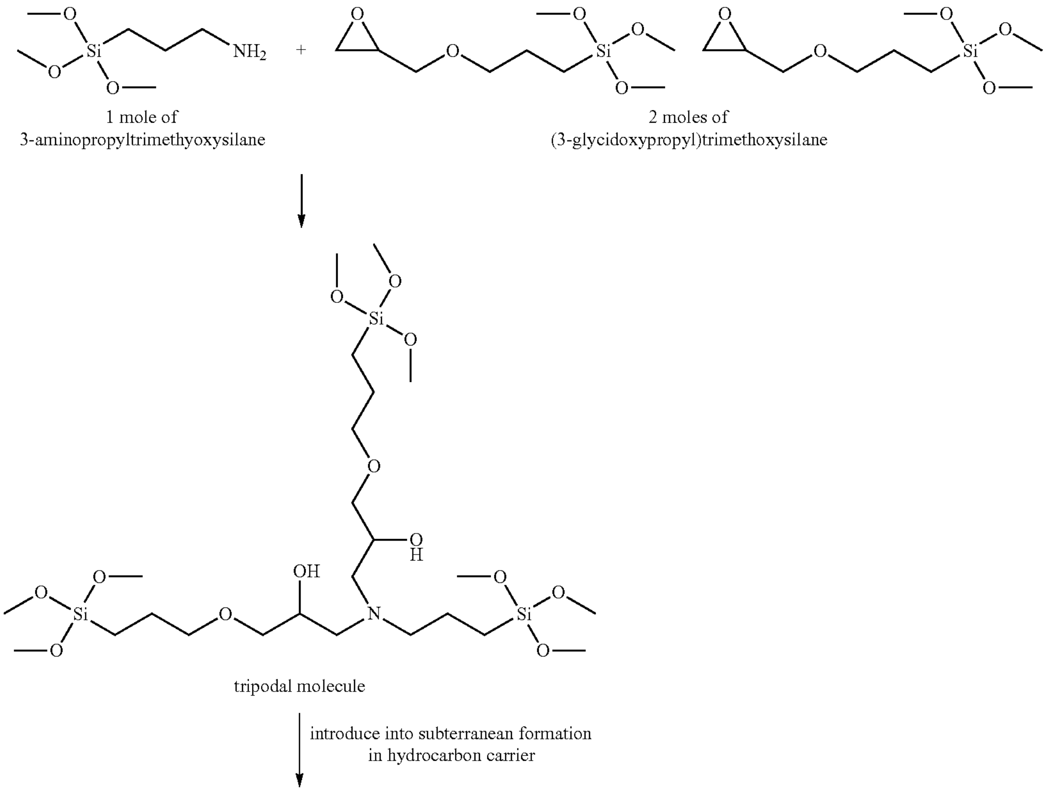

1 mole of
3-aminopropyltrimethyoxysilane 2 moles of
(3-glycidoxypropyl)trimethoxysilane tripodal molecule -continued

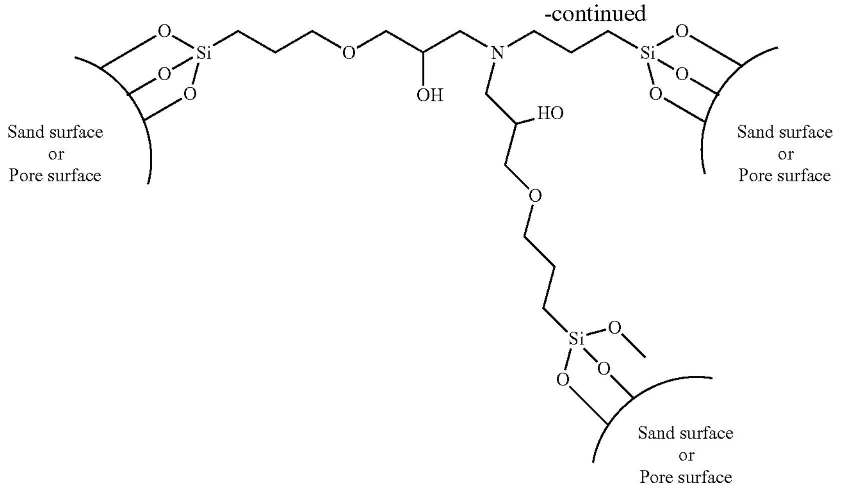

The above shows every silanol group of the tripodal molecule has reacted with active sites (e.g., Si—OH bonds) on the surface of the sand particles, forming a covalent bond. However, it should be understood that any number of the silanol groups (1, 2, or 3) on each silicon-containing terminal group may react with the surface of sand particles while others of the silanol groups on each silicon-containing terminal group may react with other tri- or multipodal molecules or other particulates or compounds in the downhole environment.

In aspects, the multipodal product is present in the first composition in a range of from about 1 wt % to about 20 wt % based on a total weight of the first composition. In aspects where the first composition is a sand consolidation composition that bonds to a sand surface of sand in the subterranean formation, the first composition is a sand consolidation composition and the multipodal product is present in the sand consolidation composition in a range of from about 1 wt % to 3 wt % based on a total weight of the sand consolidation composition. In aspects where the first composition is a water block composition that bonds to a pore surface in a pore of the subterranean formation, the first composition is a water block composition and the multipodal product is present in the water block composition in a range of from greater than 3 wt % to about 20 wt % based on a total weight of the water block composition.

the composition bonds to i) a sand surface of sand in the subterranean formation or ii) a pore surface in a pore of the subterranean formation.

In further aspects, the first composition can have less than 0.5, 0.4, 0.3, 0.2, 0.1, 0.01, 0.001, or 0.0001 wt % water based on a total weight of the first composition. In yet further aspects, the first composition has no water or is free of water. Having no water or being free of water means less than 0.001 wt % (10 ppmw), less than 0.0001 wt % (1 ppmw), or 0 ppmw water based on a total weight of the first composition. The absence of water in the first composition helps to prevent hydrolyzation of the multipodal product prior to introducing the first composition to the subterranean formation.

The aminosilane of the first composition can have the general formula $X_3$—Si—R, where each X is independently selected from a halide group (e.g., containing Cl, F, Br, or I) or an alkoxy group and R is an organo group (e.g., a C4-C20 aliphatic carbon chain) with a primary or secondary amine functional group. In aspects, the amine functional group is a terminal group on the aminosilane. Nonlimiting examples of the aminosilane component in the first composition include but are not limited to N-[3-(trimethoxysilyl)propyl]ethylenediamine, 3-aminopropyltriethoxysilane, 3-aminopropyltrimethoxysilane, 4-aminobutyltriethoxysilane, aminophenyltrimethoxysilane, 3-aminopropyltris(methoxyethoxyethoxy)silane, 11-aminodecyltriethoxysilane, 2-(4-pyridylethyl)triethoxysilane, 3-aminopropyl diisopropylethoxysilane, 3-aminopropyl dimethylethoxysilane, N-(2-amlnoethyl)-3-aminopropyl-triethoxysilane, N-(6-aminohexyl)aminomethyl-triethoxysilane, N-(6-aminohexyl)aminopropyl-trimethoxysilane, (3-trimethoxysilylpropyl)diethylene triamlne, N-butylaminopropyltrimethoxysilane, bis(2-hydroxyethyl)-3-amlnopropyltriethoxysilane, 3-(N-styrylmethyl-2-aminoethylamino)propyltrimethoxysilane hydrochloride, or combinations thereof.

The epoxysilane of the first composition can have the general formula $X_3$—Si—R, where each X is independently selected from a halide group (e.g., containing Cl, F, Br, or I) or an alkoxy group and R is an organo group (e.g., a C4-C20 aliphatic carbon chain) with an epoxy functional group. Nonlimiting examples of the epoxysilane component in the first composition include but are not limited to (3-glycidoxypropyl)trimethoxysilane, (3-glycidoxypropyl) triethoxysilane, 5,6-epoxyhexyltriethoxysilane, (3-glycidoxypropyl) methyldiethoxysilane, (3-glycidoxypropyl) methyldimethoxysilane, (3-glycidoxypropyl) dimethylethoxysilane, or combinations thereof.

In aspects, the $X_3$—Si groups of the aminosilane component are the same. In additional or alternative aspects, the $X_3$—Si groups of the epoxysilane component are the same.

In aspects, the $X_3$—Si groups of the aminosilane component and the $X_3$—Si groups of the epoxysilane component are the same; alternatively, the $X_3$13 Si groups of the aminosilane component are not the same as the $X_3$—Si groups of the epoxysilane component.

Nonlimiting examples of the hydrocarbon carrier in the first composition include but are not limited to crude oil, a base oil, an aliphatic hydrocarbon having 6 or more carbon atoms, an aromatic hydrocarbon having 6 or more carbon atoms, kerosene, naphtha, diesel fuel, or combinations thereof.

Second Composition

Disclosed herein is a second composition comprising, consisting of, or consisting essentially of 1) a multipodal molecule comprising an aminosilane component and a silane-free cross linking component having two or more linking groups; and 2) a hydrocarbon carrier. In aspects, the composition has less than 0.5 wt % water based on a total weight of the composition. In aspects, the multipodal molecule is present in a range of from about 1 wt % to about 50 wt % based on a total weight of the composition. The second composition can be embodied as a sand consolidation composition, and in such embodiments, the multipodal molecule is present in a range of from about 1 wt % to 8 wt % based on a total weight of the sand consolidation composition. Alternatively, the second composition can be embodied as a water block composition, and in such embodiments, the multipodal molecule is present in a range of from greater than 8 wt % to about 50 wt % based on a total weight of the water block composition. The second composition can be used in the method.

In aspects, a second composition can be formed by combining an aminosilane component, a silane-free cross linking component having two or more linking groups, and a hydrocarbon carrier. In aspects, the aminosilane component, the silane-free cross linking component, and the hydrocarbon carrier can be combined in a single step to form the composition. In alternative aspects, the aminosilane component and the silane-free cross linking component can be combined to form the multipodal product, and the multipodal product can then be combined with the hydrocarbon carrier to form the composition.

The second composition can be formed prior to introducing the second composition into the subterranean formation (e.g., formed in a manufacturing facility remote from the well-site, or formed at the well-site prior to introduction via the wellbore).

Combining the aminosilane component and the silane-free cross linking component (before combining with the hydrocarbon carrier or during combining with the hydrocarbon carrier) forms the multipodal product, which can be dipodal, tripodal, quadrapodal, and so on. The mole ratio of the aminosilane component to the silane-free cross linking component can range from excess aminosilane component to excess silane-free cross linking component. That is, even small amounts of one of the components can cause reaction to form the multipodal products disclosed herein.

Below illustrates the combination of the aminosilane component and the silane-free cross linking component having two linking groups to form a dipodal product having dipodal molecules.

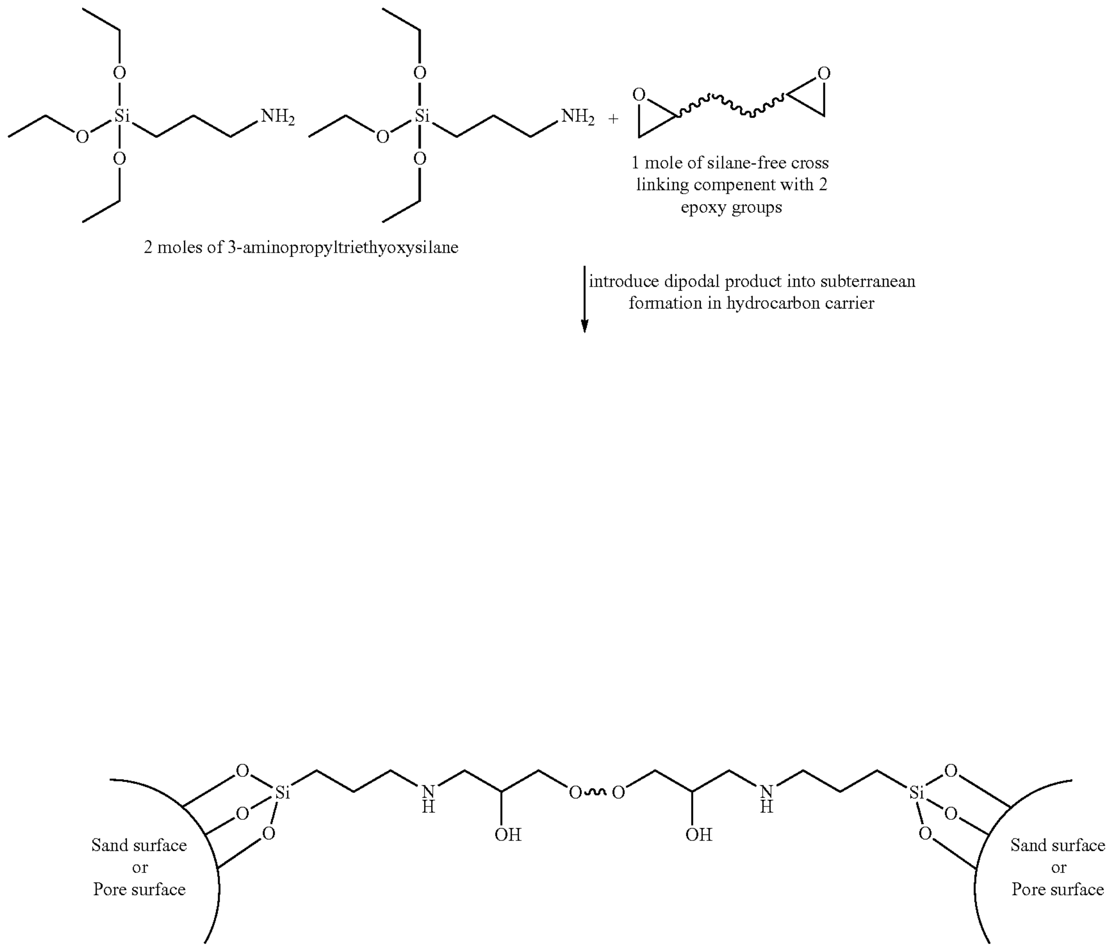

The above shows every silanol group of the dipodal molecule has reacted with active sites (e.g., Si—OH bonds) on the surface of the sand particles, forming a covalent bond.

However, it should be understood that any number of the silanol groups (1, 2, or 3) on each silicon-containing terminal group may react with the surface of sand particles while others of the silanol groups on each silicon-containing terminal group may react with other di- or multipodal molecules or other particulates or compounds in the downhole environment.

Below illustrates the combination of the aminosilane component and the silane-free cross linking component having two linking groups to form a tripodal product having tripodal molecules.

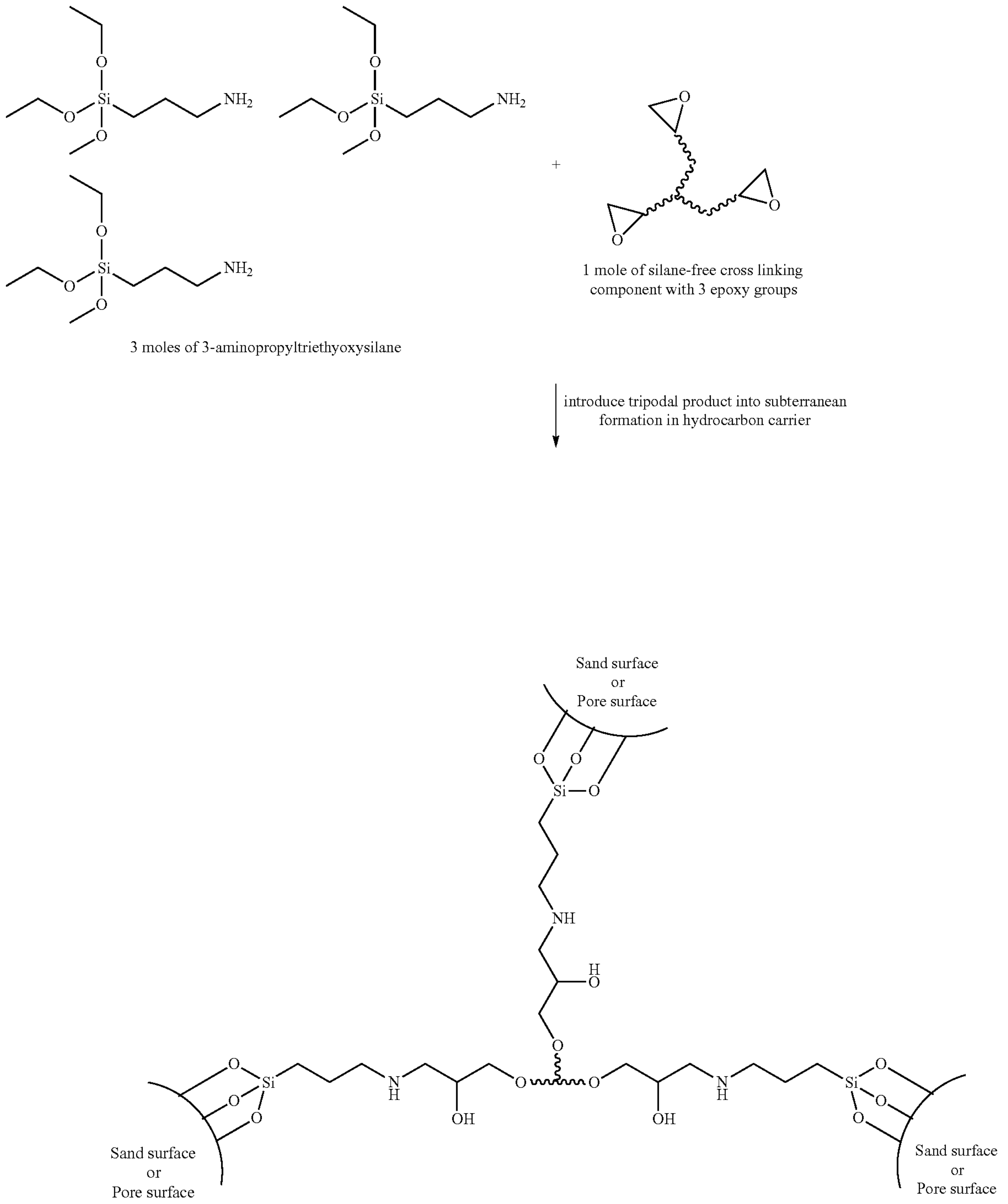

3 moles of 3-aminopropyltriethyoxysilane 1 mole of silane-free cross linking component with 3 epoxy groups The above shows every silanol group of the tripodal molecule has reacted with active sites (e.g., Si—OH bonds) on the surface of the sand particles, forming a covalent bond. However, it should be understood that any number of the silanol groups (1, 2, or 3) on each silicon-containing terminal group may react with the surface of sand particles while others of the silanol groups on each silicon-containing terminal group may react with other tri- or multipodal molecules or other particulates or compounds in the downhole environment.

Below illustrates the combination of the aminosilane component and the silane-free cross linking component having two linking groups to form a quadrapodal product having quadrapodal molecules.

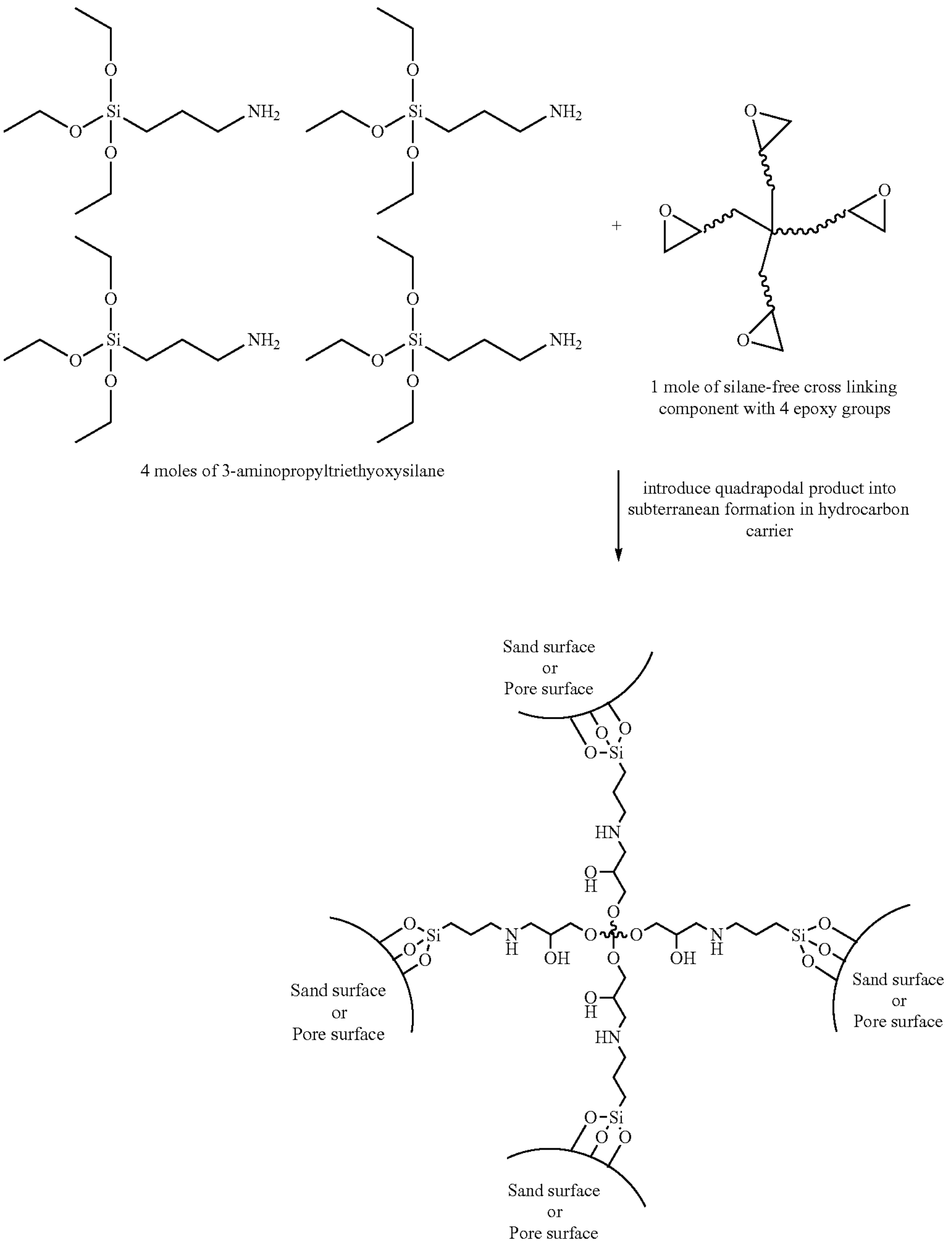

4 moles of 3-aminopropyltriethyoxysilane 1 mole of silane-free cross linking component with 4 epoxy groups The above shows every silanol group of the quadrapodal molecule has reacted with active sites (e.g., Si—OH bonds) on the surface of the sand particles, forming a covalent bond. However, it should be understood that any number of the silanol groups (1, 2, or 3) on each silicon-containing terminal group may react with the surface of sand particles while others of the silanol groups on each silicon-containing terminal group may react with other quadra- or multipodal molecules or other particulates or compounds in the downhole environment.

In aspects, the multipodal product is present in the second composition in a range of from about 1 wt % to about 50 wt % based on a total weight of the second composition. In aspects where the second composition is a sand consolidation composition that bonds to a sand surface of sand in the subterranean formation, the second composition is a sand consolidation composition and the multipodal product is present in the sand consolidation composition in a range of from about 1 wt % to 8 wt % based on a total weight of the sand consolidation composition. In aspects where the second composition is a water block composition that bonds to a pore surface in a pore of the subterranean formation, the second composition is a water block composition and the multipodal product is present in the water block composition in a range of from greater than 8 wt % to about 50 wt % based on a total weight of the water block composition.

In further aspects, the second composition can have less than 0.5, 0.4, 0.3, 0.2, 0.1, 0.01, 0.001, or 0.0001 wt % water based on a total weight of the second composition. In yet further aspects, the second composition has no water or is free of water. Having no water or being free of water means less than 0.001 wt % (10 ppmw), less than 0.0001 wt % (1 ppmw), or 0 ppmw water based on a total weight of the second composition. The absence of water in the second composition helps to prevent hydrolyzation of the multipodal product prior to introducing the second composition to the subterranean formation.

The aminosilane of the second composition can is the same as described above for the first composition.

Use of "silane-free" with references to the silane-free cross linking component means the cross linking component has no silicon-containing terminal groups that can bond to the surface of sand particles. This is in contrast to the aminosilanes and epoxysilanes disclosed herein, which having silicon-containing terminal groups. In aspects, the silane-free cross linking component is not a silane-based compound.

In aspects, the silane-free cross linking component has two or more linking groups that can be selected from one or more epoxy group, one or more aldehyde group, one or more acyl chloride group, one or more isocyanate group, one or more carboxylic acid group, or combinations thereof. For example, the silane-free cross linking component can be an epoxy-based compound having two or more epoxy groups, an aldehyde-based compound having two or more aldehyde groups, an acyl chloride-based compound having two or more acyl chloride groups, an isocyanate-based compound having two or more isocyanate groups, a carboxylic acid-based compound having two or more carboxylic acid groups, or combinations thereof.

Nonlimiting examples of the silane-free cross linking component having two or more linking groups include but are not limited to trimethylpropane diglycidyl ether, trimethylpropane triglycidyl ether, ethylene glycol diglycidyl ether, cyclohexanedimethanol diglycidyl ether, bisphenol A diglycidyl ether, sorbitol polyglycidyl ether, pentaerythritol polyglycidyl ether, glycidyl-capped polymers such as polyethylene glycol diglycidyl ether and poly(bisphenol A-co-epichlorohydrin) diglycidyl ether, polymers containing glycidyl pendant chains such as poly[(o-cresyl glycidyl ether)-co-formaldehyde] and poly(glycidyl methacrylate), or combinations thereof.

The hydrocarbon carrier in the second composition is the same as described above for the first composition.

Third Composition

Disclosed herein is a third composition comprising, consisting of, or consisting essentially of 1) a multipodal molecule comprising an epoxysilane component and a silane-free cross linking component having two or more linking groups; and 2) a hydrocarbon carrier. In aspects, the composition has less than 0.5 wt % water based on a total weight of the composition. In aspects, the multipodal molecule is present in a range of from about 1 wt % to about 50 wt % based on a total weight of the composition. The third composition can be embodied as a sand consolidation composition, and in such embodiments, the multipodal molecule is present in a range of from about 1 wt % to 8 wt % based on a total weight of the sand consolidation composition. Alternatively, the third composition can be embodied as a water block composition, and in such embodiments, the multipodal molecule is present in a range of from greater than 8 wt % to about 50 wt % based on a total weight of the water block composition. The third composition can be used in the method.

In aspects, a third composition can be formed by combining an epoxysilane component, a silane-free cross linking component having two or more linking groups, and a hydrocarbon carrier. In aspects, the epoxysilane component, the silane-free cross linking component, and the hydrocarbon carrier can be combined in a single step to form the composition. In alternative aspects, the epoxysilane component and the silane-free cross linking component can be combined to form a multipodal product, and the multipodal product can then be combined with the hydrocarbon carrier to form the composition.

Combining the epoxysilane component and the silane-free cross linking component (before combining with the hydrocarbon carrier or during combining with the hydrocarbon carrier) forms the multipodal product.

The mole ratio of the epoxysilane component to the silane-free cross linking component can range from excess epoxysilane component to excess silane-free cross linking component. That is, even small amounts of one of the components can cause reaction to form the multipodal products disclosed herein.

Below illustrates the combination of the epoxysilane component and the silane-free cross linking component having two linking groups to form a dipodal product having dipodal molecules.

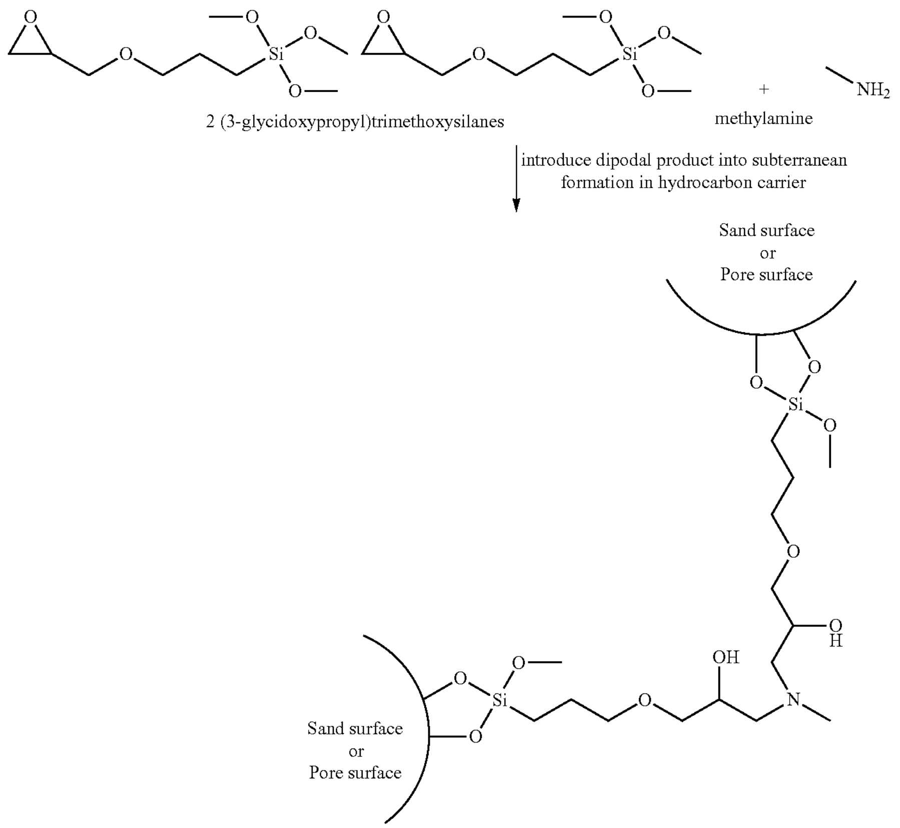

The above shows two of the three silanol groups of the dipodal molecule have reacted with active sites (e.g., Si—OH bonds) on the surface of the sand particles, forming a covalent bond. However, it should be understood that any number of the silanol groups (1, 2, or 3) on each silicon-containing terminal group may react with the surface of sand particles while others of the silanol groups on each silicon-containing terminal group may react with other di- or multipodal molecules or other particulates or compounds in the downhole environment.

In aspects, the multipodal product is present in the third composition in a range of from about 1 wt % to about 50 wt % based on a total weight of the third composition. In aspects where the third composition is a sand consolidation composition that bonds to a sand surface of sand in the subterranean formation, the third composition is a sand consolidation composition and the multipodal product is present in the sand consolidation composition in a range of from about 1 wt % to 8 wt % based on a total weight of the sand consolidation composition. In aspects where the third composition is a water block composition that bonds to a pore surface in a pore of the subterranean formation, the third composition is a water block composition and the multipodal product is present in the water block composition in a range of from greater than 8 wt % to about 50 wt % based on a total weight of the water block composition.

In further aspects, the third composition can have less than 0.5, 0.4, 0.3, 0.2, 0.1, 0.01, 0.001, or 0.0001 wt % water based on a total weight of the third composition. In yet further aspects, the third composition has no water or is free of water. Having no water or being free of water means less than 0.001 wt % (10 ppmw), less than 0.0001 wt % (1 ppmw), or 0 ppmw water based on a total weight of the third composition. The absence of water in the third composition helps to prevent hydrolyzation of the multipodal product prior to introducing the third composition to the subterranean formation.

The epoxysilane component in the third composition is the same as described above for the first composition.

Use of "silane-free" with references to the silane-free cross linking component means the cross linking component has no silicon-containing terminal groups that can bond to the surface of sand particles. This is in contrast to the aminosilanes and epoxysilanes disclosed herein, which having silicon-containing terminal groups. In aspects, the silane-free cross linking component is not a silane-based compound.

In aspects, the silane-free cross linking component has two or more linking groups that can be selected from one or more amine group, one or more epoxy group, one or more alcohol group, one or more isocyanate group, one or more carboxylic acid group, or combinations thereof. For example, the silane-free cross linking component can be an amine-based compound having two or more amine groups, an epoxy-based compound having two or more epoxy groups, a molecule having two or more alcohol groups, an isocyanate-based compound having two or more isocyanate groups, a carboxylic acid-based compound having two or more carboxylic acid groups, or combinations thereof.

Nonlimiting examples of the silane-free cross linking component having two or more linking groups include but are not limited to trimethylpropane diglycidyl ether, trimethylpropane triglycidyl ether, ethylene glycol diglycidyl ether, cyclohexanedimethanol diglycidyl ether, bisphenol A diglycidyl ether, sorbitol polyglycidyl ether, pentaerythritol polyglycidyl ether, glycidyl-capped polymers such as polyethylene glycol diglycidyl ether and poly(bisphenol A-co-epichlorohydrin) diglycidyl ether, polymers containing glycidyl pendant chains such as poly[(o-cresyl glycidyl ether)-co-formaldehyde] and poly(glycidyl methacrylate), an aliphatic amine, a cycloaliphatic amine, a heterocyclic amine, amidoamine, triethylenetetraamine, ethylenediamine, N-(coco alkyl)trimethylenediamine, isophoronediamine, N-[3-(trimethoxysilyl) propyl]ethylenediamine, or combinations thereof.

The hydrocarbon carrier in the third composition is the same as described above for the first composition.

Fourth Composition

Disclosed herein is a fourth composition comprising, consisting of, or consisting essentially of 1) a multipodal molecule comprising an aminosilane component, an epoxysilane component, and a silane-free cross linking component; and 2) a hydrocarbon carrier. In aspects, the composition has less than 0.5 wt % water based on a total weight of the composition. In aspects, the multipodal molecule is present in a range of from about 1 wt % to about 50 wt % based on a total weight of the composition. The fourth composition can be embodied as a sand consolidation composition, and in such embodiments, the multipodal molecule is present in a range of from about 1 wt % to 8 wt % based on a total weight of the sand consolidation composition. Alternatively, the fourth composition can be embodied as a water block composition, and in such embodiments, the multipodal molecule is present in a range of from about greater than 8 wt % to about 50 wt % based on a total weight of the water block composition. The fourth composition can be used in the method.

In aspects, a fourth composition can be formed by combining an aminosilane component, an epoxysilane component, a silane-free cross linking component having two or more linking groups, and a hydrocarbon carrier, to form a multipodal product in the hydrocarbon carrier. In aspects, the aminosilane component, the epoxysilane component, the silane-free cross linking component, and the hydrocarbon carrier can be combined in a single step to form the composition. In alternative aspects, the aminosilane component, the epoxysilane component, and the silane-free cross linking component can be combined to form the multipodal product, and the multipodal product can then be combined with the hydrocarbon carrier to form the composition.

The fourth composition can be formed prior to introducing the fourth composition into the subterranean formation (e.g., formed in a manufacturing facility remote from the well-site, or formed at the well-site prior to introduction via the wellbore).

Combining the aminosilane component, the epoxysilane component, and the silane-free cross linking component (before combining with the hydrocarbon carrier or during combining with the hydrocarbon carrier) forms the multipodal product.

The aminosilane component, the epoxysilane component, and the hydrocarbon carrier in the fourth composition are the same as described above for the first composition. The silane-free cross linking component in the fourth composition is the same as described for the second and third compositions.

In aspects, the multipodal product is present in the fourth composition in a range of from about 1 wt % to about 20 wt % based on a total weight of the fourth composition. In aspects where the fourth composition is a sand consolidation composition that bonds to a sand surface of sand in the subterranean formation, the fourth composition is a sand consolidation composition and the multipodal product is present in the sand consolidation composition in a range of from about 1 wt % to 3 wt % based on a total weight of the sand consolidation composition. In aspects where the fourth composition is a water block composition that bonds to a pore surface in a pore of the subterranean formation, the fourth composition is a water block composition and the multipodal product is present in the water block composition in a range of from greater than 3 wt % to about 20 wt % based on a total weight of the water block composition.

In further aspects, the fourth composition can have less than 0.5, 0.4, 0.3, 0.2, 0.1, 0.01, 0.001, or 0.0001 wt % water based on a total weight of the fourth composition. In yet further aspects, the fourth composition has no water or is free of water. Having no water or being free of water means less than 0.001 wt % (10 ppmw), less than 0.0001 wt % (1 ppmw), or 0 ppmw water based on a total weight of the fourth composition. The absence of water in the fourth composition helps to prevent hydrolyzation of the multipodal product prior to introducing the fourth composition to the subterranean formation.

Fifth Composition

Disclosed herein is a fifth composition comprising, consisting of, or consisting essentially of 1) a multipodal molecule comprising an aminosilane component and an organosilane component, wherein a head group of the organosilane component is crosslinked with an amine group from the aminosilane; and 2) a hydrocarbon carrier. In aspects, the composition has less than 0.5 wt % water based on a total weight of the composition. In aspects, the multipodal molecule is present in a range of from about 1 wt % to about 50 wt % based on a total weight of the composition. The fifth composition can be embodied as a sand consolidation composition, and in such embodiments, the multipodal molecule is present in a range of from about 1 wt % to 8 wt % based on a total weight of the sand consolidation composition. Alternatively, the third composition can be embodied as a water block composition, and in such embodiments, the multipodal molecule is present in a range of from about greater than 8 wt % to about 50 wt % based on a total weight of the water block composition. The fifth composition can be used in the method.

In aspects, a fifth composition can be formed by combining an aminosilane component and an organosilane component, wherein a head group of the organosilane component is crosslinked with an amine group from the aminosilane, and a hydrocarbon carrier, to form a multipodal product in the hydrocarbon carrier. In aspects, the aminosilane component, the organosilane component, and the hydrocarbon carrier can be combined in a single step to form the composition. In alternative aspects, the aminosilane component and the organosilane component can be combined to form the multipodal product, and the multipodal product can then be combined with the hydrocarbon carrier to form the composition.

The fifth composition can be formed prior to introducing the fifth composition into the subterranean formation (e.g., formed in a manufacturing facility remote from the well-site, or formed at the well-site prior to introduction via the wellbore).

Combining the aminosilane component and the organosilane component (before combining with the hydrocarbon carrier or during combining with the hydrocarbon carrier) forms the multipodal product.

The aminosilane component and the hydrocarbon carrier in the fifth composition are the same as described above for the first composition.

The organosilane component includes at least one organosilane. The organosilane can be an epoxysilane or another aminosilane having one or more functional headgroups that are crosslinkable to the primary or secondary amine functional group of the first aminosilane. The functional head group(s) can be an acyl chloride group, an aldehyde group, an isocyanate group, or combinations thereof.

In aspects, the multipodal product is present in the fifth composition in a range of from about 1 wt % to about 50 wt % based on a total weight of the fifth composition. In aspects where the fifth composition is a sand consolidation composition that bonds to a sand surface of sand in the subterranean formation, the fifth composition is a sand consolidation composition and the multipodal product is present in the sand consolidation composition in a range of from about 1 wt % to 8 wt % based on a total weight of the sand consolidation composition. In aspects where the fifth composition is a water block composition that bonds to a pore surface in a pore of the subterranean formation, the fifth composition is a water block composition and the multipodal product is present in the water block composition in a range of from greater than 8 wt % to about 20 wt % based on a total weight of the water block composition.

In further aspects, the fifth composition can have less than 0.5, 0.4, 0.3, 0.2, 0.1, 0.01, 0.001, or 0.0001 wt % water based on a total weight of the fifth composition. In yet further aspects, the fifth composition has no water or is free of water. Having no water or being free of water means less than 0.001 wt % (10 ppmw), less than 0.0001 wt % (1 ppmw), or 0 ppmw water based on a total weight of the fifth composition. The absence of water in the fifth composition helps to prevent hydrolyzation of the multipodal product prior to introducing the fourth composition to the subterranean formation.

Sixth Composition

Disclosed herein is a sixth composition comprising, consisting of, or consisting essentially of 1) a multipodal molecule comprising an epoxysilane component and an organosilane component, wherein a head group of the organosilane component is crosslinked with an epoxy group from the epoxysilane; and 2) a hydrocarbon carrier. In aspects, the composition has less than 0.5 wt % water based on a total weight of the composition. In aspects, the multipodal molecule is present in a range of from about 1 wt % to about 50 wt % based on a total weight of the composition. The sixth composition can be embodied as a sand consolidation composition, and in such embodiments, the multipodal molecule is present in a range of from about 1 wt % to 8 wt % based on a total weight of the sand consolidation composition. Alternatively, the third composition can be embodied as a water block composition, and in such embodiments, the multipodal molecule is present in a range of from about greater than 8 wt % to about 50 wt % based on a total weight of the water block composition. The sixth composition can be used in the method.

In aspects, a sixth composition can be formed by combining an epoxysilane component and an organosilane component, wherein the organosilane component has one or more functional head groups that are crosslinkable to the epoxy group of the epoxysilane, and a hydrocarbon carrier, to form a multipodal product in the hydrocarbon carrier. In aspects, the epoxysilane component, the organosilane component, and the hydrocarbon carrier can be combined in a single step to form the composition. In alternative aspects, the epoxysilane component and the organosilane component can be combined to form the multipodal product, and the multipodal product can then be combined with the hydrocarbon carrier to form the composition.

The sixth composition can be formed prior to introducing the sixth composition into the subterranean formation (e.g., formed in a manufacturing facility remote from the well-site, or formed at the well-site prior to introduction via the wellbore).

Combining the epoxysilane component and the organosilane component (before combining with the hydrocarbon carrier or during combining with the hydrocarbon carrier) forms the multipodal product.

The epoxysilane component and the hydrocarbon carrier in the sixth composition are the same as described above for the first composition.

The organosilane component includes at least one organosilane. The organosilane can be another epoxysilane or an aminosilane having one or more functional headgroups that are crosslinkable to the epoxy functional group of the first epoxysilane. The functional head group(s) can be an alcohol group, an isocyanate group, a carboxylic acid group, or combinations thereof.

In aspects, the multipodal product is present in the sixth composition in a range of from about 1 wt % to about 50 wt % based on a total weight of the sixth composition. In aspects where the sixth composition is a sand consolidation composition that bonds to a sand surface of sand in the subterranean formation, the sixth composition is a sand consolidation composition and the multipodal product is present in the sand consolidation composition in a range of from about 1 wt % to 8 wt % based on a total weight of the sand consolidation composition. In aspects where the sixth composition is a water block composition that bonds to a pore surface in a pore of the subterranean formation, the sixth composition is a water block composition and the multipodal product is present in the water block composition in a range of from greater than 8 wt % to about 20 wt % based on a total weight of the water block composition.

In further aspects, the sixth composition can have less than 0.5, 0.4, 0.3, 0.2, 0.1, 0.01, 0.001, or 0.0001 wt % water based on a total weight of the sixth composition. In yet further aspects, the sixth composition has no water or is free of water. Having no water or being free of water means less than 0.001 wt % (10 ppmw), less than 0.0001 wt % (1 ppmw), or 0 ppmw water based on a total weight of the sixth composition. The absence of water in the sixth composition helps to prevent hydrolyzation of the multipodal product prior to introducing the fourth composition to the subterranean formation.

Seventh Composition

Disclosed herein is a seventh composition comprising, consisting of, or consisting essentially of 1) a multipodal molecule comprising an isocyanosilane component and an organosilane component, wherein a head group of the organosilane component is crosslinked with an isocyanate group from the isocyanosilane; and 2) a hydrocarbon carrier. In aspects, the composition has less than 0.5 wt % water based on a total weight of the composition. In aspects, the multipodal molecule is present in a range of from about 1 wt % to about 50 wt % based on a total weight of the composition. The seventh composition can be embodied as a sand consolidation composition, and in such embodiments, the multipodal molecule is present in a range of from about 1 wt % to 8 wt % based on a total weight of the sand consolidation composition. Alternatively, the seventh composition can be embodied as a water block composition, and in such embodiments, the multipodal molecule is present in a range of from about greater than 8 wt % to about 50 wt % based on a total weight of the water block composition. The seventh composition can be used in the method.

In aspects, a seventh composition can be formed by combining an isocyanosilane component and an organosilane component, wherein the organosilane component has one or more functional head groups that are crosslinkable to the isocyano group of the isocyanosilane, and a hydrocarbon carrier, to form a multipodal product in the hydrocarbon carrier. In aspects, the isocyanosilane component, the organosilane component, and the hydrocarbon carrier can be combined in a single step to form the composition. In alternative aspects, the isocyanosilane component and the organosilane component can be combined to form the multipodal product, and the multipodal product can then be combined with the hydrocarbon carrier to form the composition.

The seventh composition can be formed prior to introducing the seventh composition into the subterranean formation (e.g., formed in a manufacturing facility remote from the well-site, or formed at the well-site prior to introduction via the wellbore).

Combining the isocyanosilane component and the organosilane component (before combining with the hydrocarbon carrier or during combining with the hydrocarbon carrier) forms the multipodal product.

The isocyanosilane component and the hydrocarbon carrier in the seventh composition are the same as described above for the first composition.

The organosilane component includes at least one organosilane. The organosilane can be an epoxysilane or an aminosilane having one or more functional headgroups that are crosslinkable to the isocyano functional group of the isocyanosilane. The functional head group(s) can be a primary amine group, a secondary amine group, a primary alcohol group, a secondary alcohol group, a mercapto group, a carboxylic acid group, or combinations thereof.

In aspects, the multipodal product is present in the seventh composition in a range of from about 1 wt % to about 50 wt % based on a total weight of the seventh composition. In aspects where the seventh composition is a sand consolidation composition that bonds to a sand surface of sand in the subterranean formation, the seventh composition is a sand consolidation composition and the multipodal product is present in the sand consolidation composition in a range of from about 1 wt % to 8 wt % based on a total weight of the sand consolidation composition. In aspects where the seventh composition is a water block composition that bonds to a pore surface in a pore of the subterranean formation, the seventh composition is a water block composition and the multipodal product is present in the water block composition in a range of from greater than 8 wt % to about 20 wt % based on a total weight of the water block composition.

In further aspects, the seventh composition can have less than 0.5, 0.4, 0.3, 0.2, 0.1, 0.01, 0.001, or 0.0001 wt % water based on a total weight of the seventh composition. In yet further aspects, the seventh composition has no water or is free of water. Having no water or being free of water means less than 0.001 wt % (10 ppmw), less than 0.0001 wt % (1 ppmw), or 0 ppmw water based on a total weight of the seventh composition. The absence of water in the seventh composition helps to prevent hydrolyzation of the multipodal product prior to introducing the fourth composition to the subterranean formation.

Eighth Composition

Disclosed herein is an eighth composition comprising, consisting of, or consisting essentially of 1) a multipodal molecule comprising a mercaptosilane component and an organosilane component, wherein a head group of the organosilane component is crosslinked with a mercapto group from the mercaptosilane; and 2) a hydrocarbon carrier. In aspects, the composition has less than 0.5 wt % water based on a total weight of the composition. In aspects, the multipodal molecule is present in a range of from about 1 wt % to about 50 wt % based on a total weight of the composition. The eighth composition can be embodied as a sand consolidation composition, and in such embodiments, the multipodal molecule is present in a range of from about 1 wt % to 8 wt % based on a total weight of the sand consolidation composition. Alternatively, the eighth composition can be embodied as a water block composition, and in such embodiments, the multipodal molecule is present in a range of from about greater than 8 wt % to about 50 wt % based on a total weight of the water block composition. The eighth composition can be used in the method.

In aspects where two organosilanes are used to form the composition, the first organosilane can be a mercaptosilane and the second organosilane can contain one or more headgroups having an isocyanate group, a vinyl group, or a combination thereof.

In aspects, an eighth composition can be formed by combining a mercaptosilane component and an organosilane component, wherein the organosilane component has one or more functional head groups that are crosslinkable to the mercapto group of the mercaptosilane, and a hydrocarbon carrier, to form a multipodal product in the hydrocarbon carrier. In aspects, the mercaptosilane component, the organosilane component, and the hydrocarbon carrier can be combined in a single step to form the composition. In alternative aspects, the mercaptosilane component and the organosilane component can be combined to form the multipodal product, and the multipodal product can then be combined with the hydrocarbon carrier to form the composition.

The eighth composition can be formed prior to introducing the eighth composition into the subterranean formation (e.g., formed in a manufacturing facility remote from the well-site, or formed at the well-site prior to introduction via the wellbore).

Combining the mercaptosilane component and the organosilane component (before combining with the hydrocarbon carrier or during combining with the hydrocarbon carrier) forms the multipodal product.

The mercaptosilane component and the hydrocarbon carrier in the eighth composition are the same as described above for the first composition.

The organosilane component includes at least one organosilane. The organosilane can be an epoxysilane or an aminosilane having one or more functional headgroups that are crosslinkable to the mercapto functional group of the mercaptosilane. The functional head group(s) can be an isocyanate group, a vinyl group, or a combination thereof.

In aspects, the multipodal product is present in the eighth composition in a range of from about 1 wt % to about 50 wt % based on a total weight of the eighth composition. In aspects where the eighth composition is a sand consolidation composition that bonds to a sand surface of sand in the subterranean formation, the eighth composition is a sand consolidation composition and the multipodal product is present in the sand consolidation composition in a range of from about 1 wt % to 8 wt % based on a total weight of the sand consolidation composition. In aspects where the eighth composition is a water block composition that bonds to a pore surface in a pore of the subterranean formation, the eighth composition is a water block composition and the multipodal product is present in the water block composition in a range of from greater than 8 wt % to about 20 wt % based on a total weight of the water block composition.

In further aspects, the eighth composition can have less than 0.5, 0.4, 0.3, 0.2, 0.1, 0.01, 0.001, or 0.0001 wt % water based on a total weight of the eighth composition. In yet further aspects, the eighth composition has no water or is free of water. Having no water or being free of water means less than 0.001 wt % (10 ppmw), less than 0.0001 wt % (1 ppmw), or 0 ppmw water based on a total weight of the eighth composition. The absence of water in the eighth composition helps to prevent hydrolyzation of the multipodal product prior to introducing the fourth composition to the subterranean formation.

Any of the compositions disclosed herein can be combined with one or more other additives. The one or more additives may include any water-free additive. For example, the additive can be embodied as an asphaltene inhibitor, a paraffin inhibitor, or any other water-free additive that may include surfactants, thickeners, diversion agents, pH buffers, catalysts, or combinations thereof.

When formulated as sand consolidation compositions, the compositions disclosed herein retain a permeability of the subterranean formation to water (e.g., embodied as brine) of greater than 10%, e.g., greater than 10, 11, 12, 13, 14, 15, 16, 17, 18, 19, or 20% of an initial permeability of the subterranean formation to water. In aspects, in combination with the retained permeability to water, the sand consolidation compositions disclosed herein retain a permeability of the subterranean formation to hydrocarbons (e.g., oil) of greater than 95, 96, 97, 98, or 99% of an initial permeability of the subterranean formation to hydrocarbons.

When formulated as water block compositions, the compositions disclosed herein reduce a permeability of the subterranean formation to water (e.g., embodied as brine) to 10% or less, e.g., 10, 9, 8, 7, 6, 5, 4, 3, 2, 1, or 0% of an initial permeability of the subterranean formation to water. In aspects, in combination with the reduced permeability to water, the water block compositions disclosed herein reduce permeability of the subterranean formation to hydrocarbons (e.g., oil) to at least 15, 16, 17, 17, 19, 20, 21, 22, 23, 24, or 25% of an initial permeability of the subterranean formation to hydrocarbons.

Methods

The methods disclosed herein include combining components as described herein above to form one of the compositions. The methods disclosed herein can further include introducing the composition into the subterranean formation via a wellbore that is formed in the subterranean formation. The step of introducing the composition generally utilizes a fluid pressure sufficient to allow the composition to penetrate from the wellbore into the subterranean formation.

The flow rate of the composition while introducing the composition into the subterranean formation be in the range of from 75 to 3000 liters/min; alternatively, from 75 to 2000 liters/min; alternatively, from 75 to 1000 liters/min; alternatively, from 75 to 500 liters/min; alternatively, from 75 to 400 liters/min.

The amount of time that the composition is introduced, and any period of shut-in, can depend on a number of factors including the nature of the subterranean formation, the degree of required, the nature and concentration of the components employed, the depth of fractures, etc. Shut-in times can range from 1 to 3 days; alternatively, from 20 to 24 hours; alternatively, 2 to 10 hours; alternatively, from 3 to 8 hours; alternatively, from about 4 to 6 hours. Shut-in times can vary depending on the temperature downhole. For example, shorter shut-in times can be suitable for higher temperatures downhole, while longer shut-in times can be suitable for lower temperatures downhole. An example of a shut-in time is up to 2 days shut-in time for a sand consolidation composition. An example of shut-in time is from 2 days to 10 days for a water block composition disclosed herein. The amount of shut-in time depends on temperature of the subterranean formation, where a shorter shut-in time corresponds with a higher formation temperature and a longer shut-in time corresponds with a lower formation temperature.

Any technique can be used to introduce the composition to the subterranean formation. Techniques can include bullheading, coil tubing, zonal isolation with packers, or combinations thereof.

Methods the utilize a water block composition disclosed herein may not utilize a pre-flush step, since doing so can remove water from the pores of the subterranean formation, which lowers the reactivity of the water block composition with the pore surfaces in the pores of the subterranean formation. When the multipodal molecules can react with the pore surfaces and block the pores, the water block operation can significantly impact the permeability of the subterranean formation so as to block a permeation of water from the subterranean formation.

Methods that utilize a sand consolidation composition can utilize a pre-flush step, since removing the water from the pores of the subterranean formation can prevent reaction of the sand consolidation composition with the subterranean formation. Before introducing the sand consolidation composition, the method can also include introducing a pre-flush fluid into the same location in the subterranean formation that the sand consolidation composition is to be introduced. The pre-flush fluid can include or consist of crude oil, a base oil, an aliphatic hydrocarbon having 6 or more carbon atoms, an aromatic hydrocarbon having 6 or more carbon atoms, kerosene, naphtha, diesel fuel, or combinations thereof. In aspects, the pre-flush fluid contains less than 10, 9, 8, 7, 6, 5, 4, 3, 2, or 1 wt % water based on a total weight of the pre-flush fluid. In aspects, the pre-flush fluid can remove water that is present in the pore spaces of the subterranean formation, while leaving water molecules that surround the sand particles (e.g. those water molecules that are bound to the sand particles by hydrogen bonding). This water can be referred to as the "residual water" or connate water. Introducing the sand consolidation composition disclosed herein after introducing the pre-flush fluid can limit the contact of the multipodal molecules in the composition with the water molecules that are bound to the sand particles by hydrogen bonding. As such, hydrolysis of the disclosed compositions can occur in close vicinity to the sand particles and the silanols produced can react with active sites (e.g. —Si—OH groups) on the surface of the sand particle surface. The pre-flush prevents bonding of the multipodal molecules on pore surfaces in the pores of the subterranean formation since the water is removed from the pores by the pre-flush fluid. When the multipodal molecules do not block the pores, the sand consolidation operation does not significantly impact the permeability of the subterranean formation.

Either before or after introducing the composition, the method can also include introducing a catalyst fluid into the same location in the subterranean formation that the composition is introduced. In aspects where a pre-flush fluid is used as described above, the catalyst fluid can be introduced as a post-fluish fluid, after introducing the composition. The rate of reaction of the hydrolysable bonds of the compositions disclosed herein can be increased by adding a catalyst such as an acidic fluid, a basic fluid, or a fluid containing a transition metal compound. Examples of a transition metal compound include titanium(IV) isopropoxide, titanium(IV) chloride, and zirconium(IV) chloride. Introducing the catalyst fluid before introducing the composition can be referred to as a pre-flush operation, and introducing the catalyst fluid after introducing the composition can be referred to as a post-flush operation.

The disclosed methods can introduce the composition via a horizontal or vertical wellbore. Moreover, the composition can be introduced into a wellbore and/or subterranean formation having a temperature in the range of from about 50° C. to about 200° C.

The steps of the disclosed methods can be repeated for any reason, such as periodically to maintain in the subterranean formation.

Other well treatments such as stimulation treatment, hydraulic fracture treatment and scale reduction treatment may be used in conjunction with the disclosed method, for example, prior to or after the method disclosed herein.

EXAMPLES

Sand Loss Test

Sand loss tests were conducted with sand column test apparatus that included a double-capped stainless steel cell with mesh screen and a heating jacket. The experiments evaluated the effectiveness of the treatment to consolidate sand particles. The sand pack was prepared by saturating the 100-mesh dry sand with 1 pore volume of synthetic sea water (SSW) in the column with 325 mesh screen at the bottom end. One pour volume of the treatment (4 wt % of the active component in oil) was poured onto the sand pack and was pushed through the sand pack with 5 psi of air until the 1 pore volume of the treatment is left in the column. The treatment on the sand was shut-in overnight at 160° F. After cooling the column down, the mesh screen was removed from the bottom of the column, was sealed back, and 4 pore volumes of SSW were poured onto the treated sand pack. The SSW flowed through the sand with 20 psi of air and the effluent was collected and filtered to obtain the sand that was lost during the process. The collected sand was then dried in the oven at 200° F. overnight, and the amount of the dried sand was measured to calculate the % sand loss.

Example 1 was a control experiment that conducted the sand loss procedure in the sand column test apparatus without treating the sand with any compositions. The sand loss in Example 1 was 88.04 wt % based on a total weight of the initial amount of sand in the test apparatus.

Example 2 demonstrated sand loss for a sand consolidation composition disclosed herein that was formed by combining an aminosilane component and a silane-free cross linking component. Particularly, the sand consolidation composition in Example 2 was formed using a monopodal aminosilane, 3-(aminopropyl) triethyoxysilane, and a silane-free cross linking component having ~2 epoxy groups per molecule, commercially available as D.E.R.® 741 from Olin Corporation. The hydrocarbon carrier used in Example 2 was deodorized kerosene. The 3-(aminopropyl) triethyoxysilane and the D.E.R.® 741 were combined in deodorized kerosene to form the sand consolidation composition. The amount of multipodal product in the sand consolidation composition was 4 wt % based on a total weight of the sand consolidation composition. The sand consolidation composition was then added to the sand column test apparatus to determine sand loss. The sand loss in Example 2 was 6.70 wt % based on a total weight of the initial amount of sand in the test apparatus. It was surprising that the smaller molecules (smaller relative to polymeric sand consolidation compositions) in the sand consolidation composition of Example 2 prevented sand loss.

It is believed that 3-(aminopropyl) triethyoxysilane in Example 2 is representative of the behavior of the aminosilane components disclosed herein when used in combination with a silane-free cross linking component as described herein. It is also believed that and that D.E.R.® 741 is representative of the behavior of the other silane-free cross linking components disclosed herein when used in combination with an aminosilane component described herein.

Coreflood Tests

Coreflood tests were used to assess the capability of compositions disclosed herein to block a permeation of water in a subterranean formation. Core flood tests are carried out using a table-top Hassler-type core holder equipped with pump, differential pressure transducers, back pressure regulator, accumulators with pistons, and fraction collector. Bentheimer cores (sandstone) with a length of 7.62 cm, diameter of 3.81 cm, cross-sectional area of 11.40 $cm^2$, and permeability between 1000-2500 mD were used for the test. A confining pressure of 500 psi (34.0 atm) was applied and a permeation rate of 1 cc/min was used for the tests.

The experimental procedure for each example was as follows:

1) Vacuum saturate the core under vacuum with brine (synthetic seawater, viscosity ~1 cP) for circa 2 hrs. Weigh the fully saturated core to determine the pore volume and porosity.
2) Load the core into the coreholder/coreflood rig at 20° C.
3) Flood with brine (synthetic seawater) at 1 cc/min until steady state dP and record the permeability of the core to brine at 1 cc/min, 2 cc/min and 3 cc/min (Initial $K_{brine}$).
4) Saturate the core with oil at 1 ml/min to steady-state dP.
5) Measure permeability of the core to oil at 1 cc/min, 2 cc/min, and 3 cc/min (Initial $K_{oil}$).
6) Inject 0.5 pore volume of the composition (4 wt % multipodal product in oil) into the core.
7) Shut-in for 2 days at room temperature.
8) Inject the core with oil at 1 cc/min to steady-state dP.
9) Remeasure the permeability to oil at 1 cc/min, 2 cc/min and 3 cc/min (Final $K_{oil}$).
10) Inject brine at 1 ml/min until no more oil is coming out of the core.
11) Measure permeability to brine at 1 cc/min, 2 cc/min and 3 cc/min (Final $K_{brine}$).

Permeability values were calculated based on the equation:

$$K = \frac{Q \times L \times \mu}{\Delta P \times A}$$

where K=permeability (Darcy), Q=flow rate (cc/sec), L=core sample length (cm), μ=brine viscosity at the working temperature (cP), ΔP=pressure drop (atm), and A=core cross-sectional area ($cm^2$).

The retained permeability to brine was calculated based on the initial and final brine permeability values, according to the following equation:

$$\%\ \text{Retained permeability to brine} = \frac{\text{Final Kbrine}}{\text{Initial Kbrine}} \times 100$$

The retained permeability to oil was calculated based on the initial and final oil permeability values, according to the following equation:

$$\%\ \text{Retained permeability to oil} = \frac{\text{Final Koil}}{\text{Initial Koil}} \times 100$$

Example 3 was a control experiment that conducted the water block procedure in the test apparatus without treating the core with any compositions, i.e., Example 3 was a blank having no composition added.

Examples 4 and 5 utilized the same sand consolidation composition as Example 2.

Examples 6 and 7 demonstrated reduced permeability of the tested core for a water block composition disclosed herein that was formed by combining an aminosilane component and an epoxysilane component. Particularly, the water block composition in Examples 5 and 6 were formed using a monopodal aminosilane, 3-(aminopropyl) triethyoxysilane, and an epoxysilane, 3-(glycidoxypropyl) trimethoxysilane (GPTMS) (1:1 molar ratio), combined with oil. The concentration of the multipodal product was 4 wt % multipodal product based on a total weight of the composition, for each of Example 6 and Example 7.

The results of permeability of the core, which represents a subterranean formation, are displayed in the table below:

| | Initial $K_{brine}$ (mD) | Initial $K_{oil}$ (mD) | Final $K_{oil}$ (mD) | Final $K_{brine}$ (mD) | Retained Permeability to Brine (%) | Retained Permeability to Oil (%) |
|---|---|---|---|---|---|---|
| Example 3 (blank) | 1665 | 580 | 667 | 242 | 14.5 | 115 |
| Example 4 | 1778 | 1112 | 1063 | 257 | 14.5 | 95.6 |
| Example 5 | 2161 | 1085 | 1043 | 302 | 14.0 | 96.1 |
| Example 6 | 1151 | 669 | 102 | 59 | 5.1 | 15.2 |
| Example 7 | 1668 | 666 | 168 | Blocked | 0 | 25.2 |

As can be seen, the composition in Example 4 has a Retained Permeability to brine that is similar to the blank (14.5%), meaning that the treatment did not contribute to the reduction of permeability to the brine and had a high Retained Permeability of 95.6% to oil. These results are the similar to Example 5 which had a Retained Permeability of 14.0% to brine and a Retained Permeability of 96.1% to oil.

In contrast, the composition in Example 6 reduced the permeability of the core to water and retained permeability of the core to oil such that Example 6 had a Retained Permeability of 5.1% to brine and a Retained Permeability of 15.2% to oil. The composition in Example 7 reduced the permeability of the core to water and retained permeability of the core to oil such that Example 7 had a Retained Permeability of 0% to brine and a Retained Permeability of 25.2% to oil.

ADDITIONAL DESCRIPTION

Aspects Set 1

Aspect 1. A method comprising: combining 1) a) an aminosilane component and an epoxysilane component, b) an aminosilane component and a silane-free cross linking component having two or more linking groups, c) an epoxysilane component and a silane-free cross linking component, d) an aminosilane component, an epoxysilane component, and a silane-free cross linking component, e) an aminosilane component comprising an aminosilane and an organosilane component comprising an organosilane having one or more head groups configured to crosslink with an amine group of the aminosilane, f) an epoxysilane component comprising an epoxysilane and an organosilane component comprising an organosilane having one or more head groups configured to crosslink with an epoxy group of the epoxysilane, g) an isocyanosilane component and an organosilane component having one or more head groups of a primary amine group, a secondary amine group, a primary alcohol group, a secondary alcohol group, a mercapto group, or a carboxylic acid group, or h) a mercaptosilane component and an organosilane component having one or more head groups of an isocyanate group or a vinyl group, and 2) a hydrocarbon carrier, to form a composition comprising a multipodal product and the hydrocarbon carrier; and introducing the composition into a subterranean formation via a wellbore that is formed in the subterranean formation such that the composition bonds to i) a sand surface of sand in the subterranean formation or ii) a pore surface in a pore of the subterranean formation.

Aspect 2. The method of Aspect 1, wherein the hydrocarbon carrier comprises a crude oil, a base oil, an aliphatic hydrocarbon having 6 or more carbon atoms, an aromatic hydrocarbon having 6 or more carbon atoms, kerosene, naphtha, diesel fuel, or combinations thereof.

Aspect 3. The method of any one of Aspects 1 to 2, wherein the composition has less than 0.5 wt % water based on a total weight of the composition.

Aspect 4. The method of any one of Aspects 1 to 3, wherein the composition has no water.

Aspect 5. The method of any one of Aspects 1 to 4, wherein the aminosilane component and the epoxysilane component are combined with the hydrocarbon carrier, wherein the multipodal product is present in the composition in a range of from about 1 wt % to about 20 wt % based on a total weight of the composition.

Aspect 6. The method of Aspect 5, wherein the composition bonds the sand surface, wherein the multipodal product is present in the composition in a range of from about 1 wt % to about 3 wt % based on a total weight of the composition.

Aspect 7. The method of Aspect 5, wherein the composition bonds to the pore surface, wherein the multipodal product is present in the composition in a range of from greater than about 3 wt % to about 20 wt % based on a total weight of the composition.

Aspect 8. The method of any one of Aspects 1 to 4, wherein the aminosilane component and the silane-free cross linking component having two or more linking groups are combined with the hydrocarbon carrier, wherein the multipodal product is present in the composition in a range of from about 1 wt % to about 50 wt % based on a total weight of the composition.

Aspect 9. The method of Aspect 8, wherein the composition bonds to the sand surface, wherein the multipodal product is present in the composition in a range of from about 1 wt % to about 8 wt % based on a total weight of the composition.

Aspect 10. The method of Aspect 8, wherein the composition bonds to the pore surface, wherein the multipodal product is present in the composition in a range of from greater than about 8 wt % to about 50 wt % based on a total weight of the composition.

Aspect 11. The method of any one of Aspects 1 to 4, wherein the epoxysilane component and the silane-free cross linking component are combined with the hydrocarbon carrier, wherein the multipodal product is present in the composition in a range of from about 1 wt % to about 50 wt % based on a total weight of the composition.

Aspect 12. The method of Aspect 11, wherein the composition bonds to the sand surface, wherein the multipodal product is present in the composition in a range of from about 1 wt % to about 8 wt % based on a total weight of the composition.

Aspect 13. The method of Aspect 11, wherein the composition bonds to the pore surface, wherein the multipodal product is present in the composition in a range of from greater than 8 wt % to about 50 wt % based on a total weight of the composition.

Aspect 14. The method of any one of Aspects 1 to 4, wherein the aminosilane component, the epoxysilane component, and the silane-free crosslinking component are combined with the hydrocarbon carrier, wherein the multipodal product is present in the composition in a range of from about 1 wt % to about 20 wt % based on a total weight of the composition.

Aspect 15. The method of Aspect 14, wherein the composition bonds the sand surface, wherein the multipodal product is present in the composition in a range of from about 1 wt % to about 3 wt % based on a total weight of the composition.

Aspect 16. The method of Aspect 14, wherein the composition bonds to the pore surface, wherein the multipodal product is present in the composition in a range of from greater than about 3 wt % to about 20 wt % based on a total weight of the composition.

Aspect 17. The method of any one of Aspects 1 to 4, wherein the aminosilane and the organosilane having one or more head groups configured to crosslink with an amine group of the aminosilane are combined with the hydrocarbon carrier, wherein the multipodal product is present in the composition in a range of from about 1 wt % to about 50 wt % based on a total weight of the composition.

Aspect 18. The method of Aspect 17, wherein the composition bonds to the sand surface, wherein the multipodal product is present in the composition in a range of from about 1 wt % to about 8 wt % based on a total weight of the composition.

Aspect 19. The method of Aspect 17, wherein the composition bonds to the pore surface, wherein the multipodal product is present in the composition in a range of from greater than 8 wt % to about 50 wt % based on a total weight of the composition.

Aspect 20. The method of any one of Aspects 1 to 4, wherein the epoxysilane and the organosilane having one or more head groups configured to crosslink with an epoxy group of the epoxysilane are combined with the hydrocarbon carrier, wherein the multipodal product is present in the composition in a range of from about 1 wt % to about 50 wt % based on a total weight of the composition.

Aspect 21. The method of Aspect 20, wherein the composition bonds to the sand surface, wherein the multipodal product is present in the composition in a range of from about 1 wt % to about 8 wt % based on a total weight of the composition.

Aspect 22. The method of Aspect 20, wherein the composition bonds to the pore surface, wherein the multipodal product is present in the composition in a range of from greater than 8 wt % to about 50 wt % based on a total weight of the composition.

Aspect 23. The method of any one of Aspects 1 to 4, wherein the isocyanosilane and the organosilane having one or more head groups of a primary amine group, a secondary amine group, a primary alcohol group, a secondary alcohol group, a mercapto group, or a carboxylic acid group are combined with the hydrocarbon carrier, wherein the multipodal product is present in the composition in a range of from about 1 wt % to about 50 wt % based on a total weight of the composition.

Aspect 24. The method of Aspect 23, wherein the composition bonds to the sand surface, wherein the multipodal product is present in the composition in a range of from about 1 wt % to about 8 wt % based on a total weight of the composition.

Aspect 25. The method of Aspect 23, wherein the composition bonds to the pore surface, wherein the multipodal product is present in the composition in a range of from greater than 8 wt % to about 50 wt % based on a total weight of the composition.

Aspect 26. The method of any one of Aspects 1 to 4, wherein the mercaptosilane and the organosilane having one or more head groups of an isocyanate group or a vinyl group are combined with the hydrocarbon carrier, wherein the multipodal product is present in the composition in a range of from about 1 wt % to about 50 wt % based on a total weight of the composition.

Aspect 27. The method of Aspect 26, wherein the composition bonds to the sand surface, wherein the multipodal product is present in the composition in a range of from about 1 wt % to about 8 wt % based on a total weight of the composition.

Aspect 28. The method of Aspect 26, wherein the composition bonds to the pore surface, wherein the multipodal product is present in the composition in a range of from greater than 8 wt % to about 50 wt % based on a total weight of the composition.

Aspect 29. The method of any one of Aspects 1 to 28, wherein the aminosilane component comprises N-[3-(trimethoxysilyl)propyl]ethylenediamine, 3-aminopropyltriethoxysilane, 3-aminopropyltrimethoxysilane, 4-aminobutyltriethoxysilane, aminophenyltrimehoxysilane, 3-aminopropyltris(methoxyethoxy-ethoxy)silane, 11-aminodecyltriethoxysilane, 2-(4-pyridylethyl) triethoxysilane, 3-aminopropyl diisopropylethoxysilane, 3-aminopropyl dimethylethoxysilane, N-(2-amlnoethyl)-3-aminopropyl-triethoxysilane, N-(6-aminohexyl)aminomethyl-triethoxysilane, N-(6-aminohexyl)aminopropyl-trimethoxysilane, (3-trimethoxysilylpropyl)diethylene triamlne, N-butylaminopropyltrimethoxysilane, bis(2-hydroxyethyl)-3-amlnopropyl-triethoxysilane, 3-(N-styrylmethyl-2-aminoethylamino) propyltrimethoxysilane hydrochloride, or combinations thereof.

Aspect 30. The method of any one of Aspects 1 to 29, wherein the epoxysilane component comprises (3-glycidoxypropyl)trimethoxysilane, (3-glycidoxypropyl) triethoxysilane, 5,6-epoxyhexyltriethoxysilane, (3-glycidoxypropyl)methyldiethoxysilane, (3-glycidoxypropyl) methyldimethoxysilane, (3-glycidoxypropyl)dimethylethoxysilane, or combinations thereof.

Aspect 31. The method of any one of Aspects 1 to 30, wherein the two or more linking groups are selected from one or more amine group, one or more epoxy group, one or more aldehyde group, one or more acyl chloride group, one or more isocyanate group, one or more carboxylic acid group, or combinations thereof.

Aspect 32. The method of any one of Aspects 1 to 31, wherein the silane-free cross linking component is selected from an amine-based compound having two or more amine groups, an epoxy-based compound having two or more epoxy groups, an aldehyde-based compound having two or more aldehyde groups, an acyl chloride-based compound having two or more acyl chloride groups, an isocyanate-based compound having two or more isocyanate groups, a carboxylic acid-based compound having two or more carboxylic acid groups, or combinations thereof.

Aspect 33. The method of any one of Aspects 1 to 32, wherein the silane-free cross linking component comprises trimethylpropane diglycidyl ether, trimethylpropane triglycidyl ether, ethylene glycol diglycidyl ether, cyclohexanedimethanol diglycidyl ether, bisphenol A diglycidyl ether, sorbitol polyglycidyl ether, pentaerythritol polyglycidyl ether, glycidyl-capped polymers such as polyethylene glycol diglycidyl ether and poly(bisphenol A-co-epichlorohydrin) diglycidyl ether, polymers containing glycidyl pendant chains such as poly[(o-cresyl glycidyl ether)-co-formaldehyde] and poly(glycidyl methacrylate), an aliphatic amine, a cycloaliphatic amine, a heterocyclic amine, amidoamine, triethylenetetraamine, ethylenediamine, N-(coco alkyl)trimethylenediamine, isophoronediamine, N-[3-(trimethoxysilyl)propyl]ethylenediamine, or combinations thereof.

Aspect 34. The method of any one of Aspects 1 to 33, wherein the composition is a sand consolidation composition, the method further comprising: prior to introducing the composition, introducing a pre-flush fluid into a same location in the subterranean formation that the composition is to be introduced.

Aspect 35. The method of any one of Aspects 1 to 34, wherein the composition is a water block composition, wherein no pre-flush fluid is introduced into a same location in the subterranean formation where the composition is introduced, prior to introducing the composition.

Aspect 36. The method of any one of Aspects 1 to 35, wherein after introducing the composition as a water block composition, a permeability of the subterranean formation to water is reduced to 10% or less of an initial permeability of the subterranean formation to water.

Aspect 37. The method of any one of Aspects 1 to 36, wherein after introducing the composition as a water block composition, a permeability of the subterranean formation to oil is reduced or retained to greater than 15% of an initial permeability of the subterranean formation to oil.

Aspect 38. The method of any one of Aspects 1 to 35, wherein after introducing the composition as a sand consolidation composition, a permeability of the subterranean formation to water is retained to greater than 10% of an initial permeability of the subterranean formation to water.

Aspect 39. The method of any one of Aspects 1 to 35 and 38, wherein after introducing the composition as a sand consolidation composition, a permeability of the subterranean formation to oil is reduced or retained to greater than 95% of an initial permeability of the subterranean formation to oil.

Aspects Set 2

Aspect 1. A method for sand consolidation in a subterranean formation, the method comprising: combining 1) a) an aminosilane component and an epoxysilane component, b) an aminosilane component and a silane-free cross linking component having two or more linking groups, c) an epoxysilane component and a silane-free cross linking component, or d) an aminosilane component, an epoxysilane component, and a silane-free cross linking component, and 2) a hydrocarbon carrier, to form a composition comprising a multipodal product and the hydrocarbon carrier; and introducing the composition into a subterranean formation via a wellbore that is formed in the subterranean formation such that the composition bonds to a sand surface of sand in the subterranean formation.

Aspect 2. The method of Aspect 1, wherein the hydrocarbon carrier comprises a crude oil, a base oil, an aliphatic hydrocarbon having 6 or more carbon atoms, an aromatic hydrocarbon having 6 or more carbon atoms, kerosene, naphtha, diesel fuel, or combinations thereof.

Aspect 3. The method of Aspect 1 or 2, wherein the composition has less than 0.5 wt % water based on a total weight of the composition.

Aspect 4. The method of any one of Aspects 1 to 3, wherein the composition has no water.

Aspect 5. The method of any one of Aspects 1 to 4, wherein the aminosilane component and the epoxysilane component are combined with the hydrocarbon carrier, wherein the multipodal product is present in the composition in a range of from about 1 wt % to 3 wt % based on a total weight of the composition.

Aspect 6. The method of any one of Aspects 1 to 4, wherein the aminosilane component and the silane-free cross linking component having two or more linking groups are combined with the hydrocarbon carrier, wherein the multipodal product is present in the composition in a range of from about 1 wt % to 8 wt % based on a total weight of the composition.

Aspect 7. The method of any one of Aspects 1 to 4, wherein the epoxysilane component and the silane-free cross linking component are combined with the hydrocarbon carrier, wherein the multipodal product is present in the composition in a range of from about 1 wt % to 8 wt % based on a total weight of the composition.

Aspect 8. The method of any one of Aspects 1 to 4, wherein the aminosilane component, the epoxysilane component, and the silane-free cross linking component are combined with the hydrocarbon carrier, wherein the multipodal product is present in the composition in a range of from about 1 wt % to 8 wt % based on a total weight of the composition.

Aspect 9. The method of any one of Aspects 1 to 8, wherein the aminosilane component comprises N-[3-(trimethoxysilyl)propyl]ethylenediamine, 3-aminopropyltriethoxysilane, 3-aminopropyltrimethoxysilane, 4-aminobutyltriethoxysilane, aminophenyltrimehoxysilane, 3-aminopropyltris(methoxyethoxy-ethoxy)silane, 11-aminodecyltriethoxysilane, 2-(4-pyridylethyl) triethoxysilane, 3-aminopropyl diisopropylethoxysilane, 3-aminopropyl dimethylethoxysilane, N-(2-amlnoethyl)-3-aminopropyl-triethoxysilane, N-(6-aminohexyl)aminomethyl-triethoxysilane, N-(6-aminohexyl)aminopropyl-trimethoxysilane, (3-trimethoxysilylpropyl)diethylene triamlne, N-butylaminopropyltrimethoxysilane, bis(2-hydroxyethyl)-3-amlnopropyl-triethoxysilane, 3-(N-styrylmethyl-2-aminoethylamino) propyltrimethoxysilane hydrochloride, or combinations thereof.

Aspect 10. The method of any one of Aspects 1 to 9, wherein the epoxysilane component comprises (3-glycidoxypropyl)trimethoxysilane, (3-glycidoxypropyl) triethoxysilane, 5,6-epoxyhexyltriethoxysilane, (3-glycidoxypropyl)methyldiethoxysilane, (3-glycidoxypropyl) methyldimethoxysilane, (3-glycidoxypropyl)dimethylethoxysilane, or combinations thereof.

Aspect 11. The method of any one of Aspects 1 to 10, wherein the two or more linking groups are selected from one or more amine group, one or more epoxy group, one or more aldehyde group, one or more acyl chloride group, one or more isocyanate group, one or more carboxylic acid group, or combinations thereof.

Aspect 12. The method of any one of Aspects 1 to 11, wherein the silane-free cross linking component is selected from an amine-based compound having two or more amine groups, an epoxy-based compound having two or more epoxy groups, an aldehyde-based compound having two or more aldehyde groups, an acyl chloride-based compound having two or more acyl chloride groups, an isocyanate-based compound having two or more isocyanate groups, a carboxylic acid-based compound having two or more carboxylic acid groups, or combinations thereof.

Aspect 13A. The method of any one of Aspects 1 to 12, wherein the silane-free cross linking component comprises trimethylpropane diglycidyl ether, trimethylpropane triglycidyl ether, ethylene glycol diglycidyl ether, cyclohexanedimethanol diglycidyl ether, bisphenol A diglycidyl ether, sorbitol polyglycidyl ether, pentaerythritol polyglycidyl ether, glycidyl-capped polymers such as polyethylene glycol diglycidyl ether and poly(bisphenol A-co-epichlorohydrin) diglycidyl ether, polymers containing glycidyl pendant chains such as poly[(o-cresyl glycidyl ether)-co-formaldehyde] and poly(glycidyl methacrylate), an aliphatic amine, a cycloaliphatic amine, a heterocyclic amine, amidoamine, triethylenetetraamine, ethylenediamine, N-(coco alkyl)trimethylenediamine, isophoronediamine, N-[3-(trimethoxysilyl)propyl]ethylenediamine, or combinations thereof.

Aspect 13B. The method of any one of Aspects 1 to 13A, wherein after introducing the composition as a sand consolidation composition, a permeability of the subterranean formation to water is retained to greater than 10% of an initial permeability of the subterranean formation to water.

Aspect 13C. The method of any one of Aspects 1 to 13B, wherein after introducing the composition as a sand consolidation composition, a permeability of the subterranean formation to oil is reduced or retained to greater than 95% of an initial permeability of the subterranean formation to oil.

Aspect 14. A sand consolidation composition comprising: a multipodal product comprising a) an aminosilane component and an epoxysilane component, b) an aminosilane component and a silane-free cross linking component having two or more linking groups, c) an epoxysilane component and a silane-free cross linking component, or d) an aminosilane component, an epoxysilane component, and a silane-free cross linking component; and a hydrocarbon carrier.

Aspect 15. The sand consolidation composition of Aspect 14, wherein the hydrocarbon carrier comprises a crude oil, a base oil, an aliphatic hydrocarbon having 6 or more carbon atoms, an aromatic hydrocarbon having 6 or more carbon atoms, kerosene, naphtha, diesel fuel, or combinations thereof.

Aspect 16. The sand consolidation composition of Aspect 14 or 15, wherein the composition has less than 0.5 wt % water based on a total weight of the composition.

Aspect 17. The sand consolidation composition of any one of Aspects 14 to 16, wherein the composition has no water.

Aspect 18. The sand consolidation composition of any one of Aspects 14 to 17, wherein the multipodal product comprises a) the aminosilane component and the epoxysilane component, wherein the multipodal product is present in the composition in a range of from about 1 wt % to 3 wt % based on a total weight of the composition.

Aspect 19. The sand consolidation composition of any one of Aspects 14 to 17, wherein the multipodal product comprises b) the aminosilane component and the silane-free cross linking component having two or more linking groups, wherein the multipodal product is present in the composition in a range of from about 1 wt % to 8 wt % based on a total weight of the composition.

Aspect 20. The sand consolidation composition of any one of Aspects 14 to 17, wherein the multipodal product comprises c) the epoxysilane component and the silane-free cross linking component, wherein the multipodal product is present in the composition in a range of from about 1 wt % to 8 wt % based on a total weight of the composition.

Aspect 21. The sand consolidation composition of any one of Aspects 14 to 17, wherein the multipodal product comprises d) the aminosilane component, the epoxysilane component, and the silane-free cross linking component, wherein the multipodal product is present in the composition in a range of from about 1 wt % to 8 wt % based on a total weight of the composition.

Aspect 22. The sand consolidation composition of any one of Aspects 14 to 21, wherein the aminosilane component comprises N-[3-(trimethoxysilyl)propyl] ethylenediamine, 3-aminopropyltriethoxysilane, 3-aminopropyltrimethoxysilane, 4-aminobutyltriethoxysilane, aminophenyltrimehoxysilane, 3-aminopropyltris(methoxyethoxy-ethoxy)silane, 11-aminodecyltriethoxysilane, 2-(4-pyridylethyl)triethoxysilane, 3-aminopropyl diisopropylethoxysilane, 3-aminopropyl dimethylethoxysilane, N-(2-amlnoethyl)-3-aminopropyl-triethoxysilane, N-(6-aminohexyl)aminomethyl-triethoxysilane, N-(6-aminohexyl)aminopropyltrimethoxysilane, (3-trimethoxysilylpropyl)diethylene triamlne, N-butylaminopropyltrimethoxysilane, bis(2-hydroxyethyl)-3-amlnopropyl-triethoxysilane, 3-(N-styrylmethyl-2-aminoethylamino) propyltrimethoxysilane hydrochloride, or combinations thereof.

Aspect 23. The sand consolidation composition of any one of Aspects 14 to 22, wherein the epoxysilane component comprises (3-glycidoxypropyl)trimethoxysilane, (3-glycidoxypropyl) triethoxysilane, 5,6-epoxyhexyltriethoxysilane, (3-glycidoxypropyl) methyldiethoxysilane, (3-glycidoxypropyl) methyldimethoxysilane, (3-glycidoxypropyl) dimethylethoxysilane, or combinations thereof.

Aspect 24. The sand consolidation composition of any one of Aspects 14 to 23, wherein the two or more linking groups are selected from one or more amine group, one or more epoxy group, one or more aldehyde group, one or more acyl chloride group, one or more isocyanate group, one or more carboxylic acid group, or combinations thereof.

Aspect 25. The sand consolidation composition of any one of Aspects 14 to 24, wherein the silane-free cross linking component is selected from an amine-based compound having two or more amine groups, an epoxy-based compound having two or more epoxy groups, an aldehyde-based compound having two or more aldehyde groups, an acyl chloride-based compound having two or more acyl chloride groups, an isocyanate-based compound having two or more isocyanate groups, a carboxylic acid-based compound having two or more carboxylic acid groups, or combinations thereof.

Aspect 26. The sand consolidation composition of any one of Aspects 14 to 25, wherein the silane-free cross linking component comprises trimethylpropane diglycidyl ether, trimethylpropane triglycidyl ether, ethylene glycol diglycidyl ether, cyclohexanedimethanol diglycidyl ether, bisphenol A diglycidyl ether, sorbitol polyglycidyl ether, pentaerythritol polyglycidyl ether, glycidyl-capped polymers such as polyethylene glycol diglycidyl ether and poly(bisphenol A-co-epichlorohydrin) diglycidyl ether, polymers containing glycidyl pendant chains such as poly[(o-cresyl glycidyl ether)-co-formaldehyde] and poly(glycidyl methacrylate), an aliphatic amine, a cycloaliphatic amine, a heterocyclic amine, amidoamine, triethylenetetraamine, ethylenediamine, N-(coco alkyl)trimethylenediamine, isophoronediamine, N-[3-(trimethoxysilyl) propyl]ethylenediamine, or combinations thereof.

Aspect 27. A method for reducing water effective permeability in a subterranean formation, the method comprising: combining 1) a) an aminosilane component and an epoxysilane component, b) an aminosilane component comprising an aminosilane and an organosilane component comprising an organosilane having one or more head groups configured to crosslink with an amine group of the aminosilane, c) an epoxysilane component comprising an epoxysilane and an organosilane component comprising an organosilane having one or more head groups configured to crosslink with an epoxy group of the epoxysilane, d) an isocyanosilane component and an organosilane component having one or more head groups of a primary amine group, a secondary amine group, a primary alcohol group, a secondary alcohol group, a mercapto group, or a carboxylic acid group, or e) a mercaptosilane component and an organosilane component having one or more head groups of an isocyanate group or a vinyl group, and 2) a hydrocarbon carrier, to form a composition comprising a multipodal product and the hydrocarbon carrier; and introducing the composition into a subterranean formation via a wellbore that is formed in the subterranean formation such that the composition bonds to a pore surface in a pore of the subterranean formation.

Aspect 28. The method of Aspect 27, wherein the hydrocarbon carrier comprises a crude oil, a base oil, an aliphatic hydrocarbon having 6 or more carbon atoms, an aromatic hydrocarbon having 6 or more carbon atoms, kerosene, naphtha, diesel fuel, or combinations thereof.

Aspect 29. The method of Aspect 27 or 28, wherein the composition has less than 0.5 wt % water based on a total weight of the composition.

Aspect 30. The method of any one of Aspects 27 to 29, wherein the composition has no water.

Aspect 31. The method of any one of Aspects 27 to 30, wherein the aminosilane component and the epoxysilane component are combined with the hydrocarbon carrier, wherein the multipodal product is present in the composition in a range of greater than 3 wt % to about 20 wt % based on a total weight of the composition.

Aspect 32. The method of any one of Aspects 27 to 30, wherein the aminosilane and the organosilane having one or more head groups configured to crosslink with an amine group of the aminosilane are combined with the hydrocarbon carrier, wherein the multipodal product is present in the composition in a range of greater than 8 wt % to about 50 wt % based on a total weight of the composition.

Aspect 33. The method of any one of Aspects 27 to 30, wherein the epoxysilane and the organosilane having one or more head groups configured to crosslink with an epoxy group of the epoxysilane are combined with the hydrocarbon carrier, wherein the multipodal product is present in the composition in a range of greater than 8 wt % to about 50 wt % based on a total weight of the composition.

Aspect 34. The method of any one of Aspects 27 to 30, wherein the isocyanosilane and the organosilane having one or more head groups of a primary amine group, a secondary amine group, a primary alcohol group, a secondary alcohol group, a mercapto group, or a carboxylic acid group are combined with the hydrocarbon carrier, wherein the multipodal product is present in the composition in a range of greater than 8 wt % to about 50 wt % based on a total weight of the composition.

Aspect 35. The method of any one of Aspects 27 to 30, wherein the mercaptosilane and the organosilane having one or more head groups of an isocyanate group or a vinyl group are combined with the hydrocarbon carrier, wherein the multipodal product is present in the composition in a range of from greater than 8 wt % to about 50 wt % based on a total weight of the composition.

Aspect 36. The method of any one of Aspects 27 to 35, wherein no pre-flush fluid is introduced into a same location in the subterranean formation where the composition is introduced, prior to introducing the composition.

Aspect 37A. The method of any one of Aspects 27 to 36, wherein after introducing the composition as a water block composition, a permeability of the subterranean formation to water is reduced to 10% or less of an initial permeability of the subterranean formation to water.

Aspect 37B. The method of any one of Aspects 27 to 37A, wherein after introducing the composition as a water block composition, a permeability of the subterranean formation to oil is reduced or retained to greater than 15% of an initial permeability of the subterranean formation to oil.

Aspect 38. A water block composition comprising: a multipodal product comprising a) an aminosilane component and an epoxysilane component, b) an aminosilane component comprising an aminosilane and an organosilane component comprising an organosilane having one or more head groups configured to crosslink with an amine group of the aminosilane, c) an epoxysilane component comprising an epoxysilane and an organosilane component comprising an organosilane having one or more head groups configured to crosslink with an epoxy group of the epoxysilane, d) an isocyanosilane component and an organosilane component having one or more head groups of a primary amine group, a secondary amine group, a primary alcohol group, a secondary alcohol group, a mercapto group, or a carboxylic acid group, or e) a mercaptosilane component and an organosilane component having one or more head groups of an isocyanate group or a vinyl group; and a hydrocarbon carrier.

Aspect 39. The water block composition of Aspect 38, wherein the hydrocarbon carrier comprises a crude oil, a base oil, an aliphatic hydrocarbon having 6 or more carbon atoms, an aromatic hydrocarbon having 6 or more carbon atoms, kerosene, naphtha, diesel fuel, or combinations thereof.

Aspect 40. The water block composition of Aspect 38 or 39, wherein the composition has less than 0.5 wt % water based on a total weight of the composition.

Aspect 41. The water block composition of any one of Aspects 38 to 40, wherein the composition has no water.

Aspect 42. The water block composition of any one of Aspects 38 to 41, wherein the multipodal product comprises a) an aminosilane component and an epoxysilane component, wherein the multipodal product is present in the composition in a range of greater than 3 wt % to about 20 wt % based on a total weight of the composition.

Aspect 43. The water block composition of any one of Aspects 38 to 41, wherein the multipodal product comprises b) the aminosilane and the organosilane having one or more head groups configured to crosslink with an amine group of the aminosilane, wherein the multipodal product is present in the composition in a range of greater than 8 wt % to about 50 wt % based on a total weight of the composition.

Aspect 44. The water block composition of any one of Aspects 38 to 41, wherein the multipodal product comprises c) the epoxysilane and the organosilane having one or more head groups configured to crosslink with an epoxy group of the epoxysilane, wherein the multipodal product is present in the composition in a range of greater than 8 wt % to about 50 wt % based on a total weight of the composition.

Aspect 45. The water block composition of any one of Aspects 38 to 41, wherein the multipodal product comprises d) the isocyanosilane and the organosilane having one or more head groups of a primary amine group, a secondary amine group, a primary alcohol group, a secondary alcohol group, a mercapto group, or a carboxylic acid group, wherein the multipodal product is present in the composition in a range of greater than 8 wt % to about 50 wt % based on a total weight of the composition.

Aspect 46. The water block composition of any one of Aspects 38 to 41, wherein multipodal product comprises e) the mercaptosilane and the organosilane having one or more head groups of an isocyanate group or a vinyl group, wherein the multipodal product is present in the composition in a range of from greater than 8 wt % to about 50 wt % based on a total weight of the composition.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for sand consolidation in a subterranean formation, the method comprising:

combining 1) an aminosilane component, an epoxysilane component, and a silane-free cross linking component having from 2 to 10 linking groups, and 2) a hydrocarbon carrier, to form a composition comprising a multipodal product and the hydrocarbon carrier, wherein the multipodal product is i) a reaction product of the aminosilane component, the epoxysilane component, and the silane-free cross linking component and ii) present in the composition in a range of from 1 wt % to 8 wt % based on a total weight of the composition; and introducing the composition into the subterranean formation via a wellbore that is formed in the subterranean formation such that the multipodal product of the composition bonds to a sand surface of sand in the subterranean formation, wherein the silane-free cross linking component is selected from an aldehyde-based compound, an acyl chloride-based compound, an isocyanate-based compound, a carboxylic acid-based compound, or combinations thereof.

2. The method of claim 1, wherein the composition has less than 0.5 wt % water based on a total weight of the composition.

3. The method of claim 1, wherein the aminosilane component has a formula $X_3$—Si—R, wherein each X is independently selected from a halide group or an alkoxy group and R is a $C_4$-$C_{20}$ aliphatic carbon chain with a primary or secondary amine functional group.

4. The method of claim 1, wherein the silane-free cross linking component further comprises an epoxy-based compound selected from trimethylpropane diglycidyl ether, trimethylpropane triglycidyl ether, ethylene glycol diglycidyl ether, cyclohexanedimethanol diglycidyl ether, bisphenol A diglycidyl ether, sorbitol polyglycidyl ether, pentaerythritol polyglycidyl ether, polyethylene glycol diglycidyl ether, poly (bisphenol A-co-epichlorohydrin) diglycidyl ether, poly [(o-cresyl glycidyl ether)-co-formaldehyde], poly (glycidyl methacrylate), or combinations thereof.

5. The method of claim 1, wherein the silane-free cross linking component further comprises an amine-based compound selected from an aliphatic amine, a cycloaliphatic amine, a heterocyclic amine, amidoamine, triethylenetetraamine, ethylenediamine, N-(coco alkyl)trimethylenediamine, isophoronediamine, N-[3-(trimethoxysilyl)propyl] ethylenediamine, or combinations thereof.

6. The method of claim 1, wherein after introducing the composition, a permeability of the subterranean formation to oil is retained to greater than 95% of a permeability of the subterranean formation to oil before introducing the composition.

* * * * *